United States Patent
Schueller et al.

(10) Patent No.: US 12,064,315 B2
(45) Date of Patent: Aug. 20, 2024

(54) INDIRECT BONDING TRAY SYSTEM

(71) Applicant: uLab Systems, Inc., Redwood City, CA (US)

(72) Inventors: Louis Schueller, Redwood City, CA (US); Huafeng Wen, Redwood Shores, CA (US); Henry Cao, San Jose, CA (US); Surya Sarva, Fremont, CA (US); Eric Wu, Palo Alto, CA (US)

(73) Assignee: uLab Systems, Inc., Memphis, TN (US)

( * ) Notice: Subject to any disclaimer, the term of this patent is extended or adjusted under 35 U.S.C. 154(b) by 381 days.

(21) Appl. No.: 16/657,639

(22) Filed: Oct. 18, 2019

(65) Prior Publication Data
US 2020/0345459 A1   Nov. 5, 2020

Related U.S. Application Data

(60) Provisional application No. 62/840,559, filed on Apr. 30, 2019.

(51) Int. Cl.
A61C 7/14   (2006.01)

(52) U.S. Cl.
CPC ..................... A61C 7/146 (2013.01)

(58) Field of Classification Search
CPC ................... A61C 7/146; A61C 7/02
See application file for complete search history.

(56) References Cited

U.S. PATENT DOCUMENTS

| | | | |
|---|---|---|---|
| 3,521,355 A * | 7/1970 | Lawrence | A61C 7/146 433/8 |
| 4,068,379 A | 1/1978 | Miller et al. | |
| 4,597,739 A | 7/1986 | Rosenberg | |
| 4,889,485 A | 12/1989 | Iida | |
| 4,983,334 A | 1/1991 | Adell | |
| 5,055,039 A | 10/1991 | Abbatte et al. | |
| 5,186,623 A | 2/1993 | Breads et al. | |
| 5,506,607 A | 4/1996 | Sanders et al. | |
| 5,691,905 A | 11/1997 | Dehoff et al. | |

(Continued)

FOREIGN PATENT DOCUMENTS

| | | |
|---|---|---|
| CA | 2557573 | 7/2012 |
| CN | 1575782 | 2/2005 |

(Continued)

OTHER PUBLICATIONS

KR200446323Y1 (Baek Cheol-ho) Transfer tray of bracket in indirect method of dental correction, Oct. 16, 2009. [retrieved on Mar. 21, 2022], Translation retrieved from: Espacenet (Year: 2009).*

(Continued)

*Primary Examiner* — Cris L. Rodriguez
*Assistant Examiner* — Courtney N Huynh
(74) *Attorney, Agent, or Firm* — Levine Bagade Han LLP

(57) ABSTRACT

Indirect bonding tray systems are disclosed where the tray may generally comprise one or more individual modules each defining a receiving channel and configured for placement upon a dentition of a subject. A removal tab having a length may extend transversely relative to the individual module and a pivoting portion may be located away from the removal tab such that the removal tab is rotatable about the pivoting portion.

14 Claims, 13 Drawing Sheets

(56) References Cited

U.S. PATENT DOCUMENTS

| | | | |
|---|---|---|---|
| 5,863,198 A * | 1/1999 | Doyle | A61C 7/146 433/3 |
| 5,975,893 A | 11/1999 | Chishti et al. | |
| 6,120,287 A | 9/2000 | Chen | |
| 6,183,248 B1 | 2/2001 | Chishti et al. | |
| 6,210,162 B1 | 4/2001 | Chishti et al. | |
| 6,217,325 B1 | 4/2001 | Chishti et al. | |
| 6,227,850 B1 | 5/2001 | Chishti et al. | |
| 6,227,851 B1 | 5/2001 | Chishti et al. | |
| 6,250,918 B1 | 6/2001 | Sachdeva et al. | |
| 6,293,790 B1 | 9/2001 | Hilliard | |
| 6,299,440 B1 | 10/2001 | Phan et al. | |
| 6,309,215 B1 | 10/2001 | Phan et al. | |
| 6,315,553 B1 | 11/2001 | Sachdeva et al. | |
| 6,386,878 B1 | 5/2002 | Pavlovskaia et al. | |
| 6,390,812 B1 | 5/2002 | Chishti et al. | |
| 6,394,801 B2 | 5/2002 | Chishti et al. | |
| 6,398,548 B1 | 6/2002 | Chishti et al. | |
| 6,454,565 B2 | 9/2002 | Phan et al. | |
| 6,463,344 B1 | 10/2002 | Pavloskaia | |
| 6,471,511 B1 | 10/2002 | Chishti et al. | |
| 6,485,298 B2 | 11/2002 | Chishti et al. | |
| 6,488,499 B1 | 12/2002 | Miller | |
| 6,524,101 B1 | 2/2003 | Phan et al. | |
| 6,554,611 B2 | 4/2003 | Chishti et al. | |
| 6,572,372 B1 | 6/2003 | Phan et al. | |
| 6,582,227 B2 | 6/2003 | Phan et al. | |
| 6,602,070 B2 | 8/2003 | Miller et al. | |
| 6,607,382 B1 | 8/2003 | Kuo et al. | |
| 6,626,666 B2 | 9/2003 | Chishti et al. | |
| 6,629,840 B2 | 10/2003 | Chishti et al. | |
| 6,682,346 B2 | 1/2004 | Chishti et al. | |
| 6,688,885 B1 | 2/2004 | Sachdeva | |
| 6,699,037 B2 | 3/2004 | Chishti et al. | |
| 6,702,575 B2 | 3/2004 | Hilliard | |
| 6,705,861 B2 | 3/2004 | Chishti et al. | |
| 6,705,863 B2 | 3/2004 | Phan et al. | |
| 6,722,880 B2 | 4/2004 | Chishti et al. | |
| 6,729,876 B2 | 5/2004 | Chishti et al. | |
| 6,761,560 B2 | 7/2004 | Miller | |
| 6,783,360 B2 | 8/2004 | Chishti | |
| 6,786,721 B2 | 9/2004 | Chishti et al. | |
| 6,802,713 B1 | 10/2004 | Chishti et al. | |
| 6,830,450 B2 | 12/2004 | Knopp et al. | |
| 6,846,179 B2 | 1/2005 | Chapouland et al. | |
| 6,857,429 B2 | 2/2005 | Eubank | |
| 6,886,566 B2 | 5/2005 | Eubank | |
| 6,964,564 B2 | 11/2005 | Phan et al. | |
| 7,011,517 B2 | 3/2006 | Nicozisis | |
| 7,029,275 B2 | 4/2006 | Rubbert et al. | |
| 7,037,108 B2 | 5/2006 | Chishti et al. | |
| 7,040,896 B2 | 5/2006 | Pavlovskaia et al. | |
| 7,056,115 B2 | 6/2006 | Phan et al. | |
| 7,059,850 B1 | 6/2006 | Phan et al. | |
| 7,063,533 B2 | 6/2006 | Phan et al. | |
| 7,074,038 B1 | 7/2006 | Miller | |
| 7,077,647 B2 | 7/2006 | Choi et al. | |
| 7,092,784 B1 | 8/2006 | Simkins | |
| 7,104,790 B2 | 9/2006 | Cronauer | |
| 7,121,825 B2 | 10/2006 | Chishti et al. | |
| 7,125,248 B2 | 10/2006 | Phan et al. | |
| 7,134,874 B2 | 11/2006 | Chishti et al. | |
| 7,156,661 B2 | 1/2007 | Choi et al. | |
| 7,160,110 B2 | 1/2007 | Imgrund et al. | |
| 7,172,417 B2 | 2/2007 | Sporbert et al. | |
| 7,192,275 B2 | 3/2007 | Miller | |
| 7,220,122 B2 | 5/2007 | Chishti | |
| 7,320,592 B2 | 1/2008 | Chishti et al. | |
| 7,326,051 B2 | 2/2008 | Miller | |
| 7,331,783 B2 | 2/2008 | Chishti et al. | |
| 7,347,688 B2 | 3/2008 | Kopelman et al. | |
| 7,416,407 B2 | 8/2008 | Cronauer | |
| 7,434,582 B2 | 10/2008 | Eubank | |
| 7,435,083 B2 | 10/2008 | Chishti et al. | |
| 7,442,041 B2 | 10/2008 | Imgrund et al. | |
| 7,458,812 B2 | 12/2008 | Sporbert et al. | |
| 7,476,100 B2 | 1/2009 | Kuo | |
| 7,481,121 B1 | 1/2009 | Cao | |
| 7,553,157 B2 | 6/2009 | Abolfathi et al. | |
| 7,559,328 B2 | 7/2009 | Eubank | |
| 7,578,673 B2 | 8/2009 | Wen et al. | |
| 7,590,462 B2 | 9/2009 | Rubbert et al. | |
| 7,637,262 B2 | 12/2009 | Bailey | |
| 7,641,828 B2 | 1/2010 | Desimone et al. | |
| 7,658,610 B2 | 2/2010 | Knopp | |
| 7,689,398 B2 | 3/2010 | Cheng et al. | |
| 7,717,708 B2 | 5/2010 | Sachdeva et al. | |
| 7,771,195 B2 | 8/2010 | Knopp et al. | |
| 7,802,987 B1 | 9/2010 | Phan et al. | |
| 7,824,180 B2 | 11/2010 | Abolfathi et al. | |
| 7,826,646 B2 | 11/2010 | Pavlovskaia et al. | |
| 7,840,247 B2 | 11/2010 | Liew et al. | |
| 7,841,858 B2 | 11/2010 | Knopp et al. | |
| 7,845,938 B2 * | 12/2010 | Kim | A61C 7/146 433/9 |
| 7,854,609 B2 | 12/2010 | Chen et al. | |
| 7,878,801 B2 | 2/2011 | Abolfathi et al. | |
| 7,878,804 B2 | 2/2011 | Korytov et al. | |
| 7,878,805 B2 | 2/2011 | Moss et al. | |
| 7,883,334 B2 | 2/2011 | Li et al. | |
| 7,901,207 B2 | 3/2011 | Knopp et al. | |
| 7,905,724 B2 | 3/2011 | Kuo et al. | |
| 7,914,283 B2 | 3/2011 | Kuo | |
| 7,942,672 B2 | 5/2011 | Kuo | |
| 7,943,079 B2 | 5/2011 | Desimone et al. | |
| 7,957,824 B2 | 6/2011 | Boronvinskih et al. | |
| 7,987,099 B2 | 7/2011 | Kuo et al. | |
| 8,001,972 B2 | 8/2011 | Eubank | |
| 8,002,543 B2 * | 8/2011 | Kang | A61C 7/145 433/3 |
| 8,021,147 B2 | 9/2011 | Sporbert et al. | |
| 8,033,282 B2 | 10/2011 | Eubank | |
| 8,038,444 B2 | 10/2011 | Kitching et al. | |
| 8,070,487 B2 | 12/2011 | Chishti et al. | |
| 8,075,306 B2 | 12/2011 | Kitching et al. | |
| 8,099,268 B2 | 1/2012 | Kitching et al. | |
| 8,099,305 B2 | 1/2012 | Kuo et al. | |
| 8,105,080 B2 | 1/2012 | Chishti et al. | |
| 8,123,519 B2 | 2/2012 | Schultz | |
| 8,152,518 B2 | 4/2012 | Kuo | |
| 8,152,523 B2 | 4/2012 | Sporbert et al. | |
| 8,177,551 B2 | 5/2012 | Sachdeva et al. | |
| 8,235,713 B2 | 8/2012 | Phan et al. | |
| 8,272,866 B2 | 9/2012 | Chun et al. | |
| 8,275,180 B2 | 9/2012 | Kuo et al. | |
| 8,292,617 B2 * | 10/2012 | Brandt | A61C 7/08 433/22 |
| 8,303,302 B2 | 11/2012 | Teasdale | |
| 8,348,665 B2 | 1/2013 | Kuo | |
| 8,356,993 B1 | 1/2013 | Marston | |
| 8,401,686 B2 | 3/2013 | Moss et al. | |
| 8,401,826 B2 | 3/2013 | Cheng et al. | |
| 8,439,672 B2 | 5/2013 | Matov et al. | |
| 8,439,673 B2 | 5/2013 | Korytov et al. | |
| 8,444,412 B2 | 5/2013 | Baughman et al. | |
| 8,465,280 B2 | 6/2013 | Sachdeva et al. | |
| 8,469,705 B2 | 6/2013 | Sachdeva et al. | |
| 8,469,706 B2 | 6/2013 | Kuo | |
| 8,496,474 B2 | 7/2013 | Chishti et al. | |
| 8,512,037 B2 | 8/2013 | Andreiko | |
| 8,517,726 B2 | 8/2013 | Kakavand et al. | |
| 8,535,580 B2 | 9/2013 | Puttler et al. | |
| 8,562,337 B2 | 10/2013 | Kuo et al. | |
| 8,562,338 B2 | 10/2013 | Kitching et al. | |
| 8,562,340 B2 | 10/2013 | Chishti et al. | |
| 8,636,509 B2 | 1/2014 | Miller | |
| 8,636,510 B2 | 1/2014 | Kitching et al. | |
| 8,690,568 B2 | 4/2014 | Chapoulaud et al. | |
| 8,708,697 B2 | 4/2014 | Li et al. | |
| 8,734,149 B2 | 5/2014 | Phan et al. | |
| 8,734,150 B2 | 5/2014 | Chishti et al. | |
| 8,738,165 B2 | 5/2014 | Cinader, Jr. et al. | |
| 8,765,031 B2 | 7/2014 | Li et al. | |
| 8,777,611 B2 | 7/2014 | Cios | |

(56) References Cited

U.S. PATENT DOCUMENTS

| | | |
|---|---|---|
| 8,780,106 B2 | 7/2014 | Chishti et al. |
| 8,807,999 B2 | 8/2014 | Kuo et al. |
| 8,858,226 B2 | 10/2014 | Phan et al. |
| 8,864,493 B2 | 10/2014 | Leslie-Martin et al. |
| 8,899,976 B2 | 12/2014 | Chen et al. |
| 8,899,978 B2 | 12/2014 | Kitching et al. |
| 8,930,219 B2 | 1/2015 | Trosien et al. |
| 8,936,464 B2 | 1/2015 | Kopelman |
| 8,998,608 B2 | 1/2015 | Trosien et al. |
| 8,944,812 B2 | 2/2015 | Kuo |
| 8,961,173 B2 | 2/2015 | Miller |
| 8,986,003 B2 | 3/2015 | Valoir |
| 8,992,215 B2 | 3/2015 | Chapoulaud et al. |
| 9,004,915 B2 | 4/2015 | Moss et al. |
| 9,022,781 B2 | 5/2015 | Kuo et al. |
| 9,026,238 B2 | 5/2015 | Kraemer et al. |
| 9,060,829 B2 | 6/2015 | Sterental et al. |
| 9,107,722 B2 | 8/2015 | Matov et al. |
| 9,119,691 B2 | 9/2015 | Namiranian et al. |
| 9,119,696 B2 | 9/2015 | Giordano et al. |
| 9,161,823 B2 | 10/2015 | Morton et al. |
| 9,161,824 B2 | 10/2015 | Chishti et al. |
| 9,204,942 B2 | 12/2015 | Phan et al. |
| 9,211,166 B2 | 12/2015 | Kuo et al. |
| 9,241,774 B2 | 1/2016 | Li et al. |
| 9,301,814 B2 | 4/2016 | Kaza et al. |
| 9,320,575 B2 | 4/2016 | Chishti et al. |
| 9,326,830 B2 | 5/2016 | Kitching et al. |
| 9,326,831 B2 | 5/2016 | Cheang |
| 9,333,052 B2 | 5/2016 | Miller |
| 9,345,557 B2 | 5/2016 | Anderson et al. |
| 9,351,809 B2 | 5/2016 | Phan et al. |
| 9,364,297 B2 | 6/2016 | Kitching et al. |
| 9,375,300 B2 | 6/2016 | Matov et al. |
| 9,414,897 B2 | 8/2016 | Wu et al. |
| 9,433,476 B2 | 9/2016 | Khardekar et al. |
| 9,492,245 B2 | 11/2016 | Sherwood et al. |
| 9,820,829 B2 | 11/2017 | Kuo |
| 9,844,420 B2 | 12/2017 | Cheang |
| 9,917,868 B2 | 3/2018 | Ahmed |
| 9,922,170 B2 | 3/2018 | Trosien et al. |
| 10,011,050 B2 | 7/2018 | Kitching et al. |
| 10,022,204 B2 | 7/2018 | Cheang |
| 10,335,250 B2 | 7/2019 | Wen |
| 10,357,336 B2 | 7/2019 | Wen |
| 10,357,342 B2 | 7/2019 | Wen |
| 10,548,690 B2 | 2/2020 | Wen |
| 10,588,723 B2 | 3/2020 | Falkel |
| 10,624,717 B2 | 4/2020 | Wen |
| 10,631,953 B2 | 4/2020 | Wen |
| 10,881,486 B2 | 1/2021 | Wen |
| 10,952,821 B2 | 3/2021 | Falkel |
| 11,051,913 B2 | 7/2021 | Wen |
| 11,096,763 B2 | 8/2021 | Akopov et al. |
| 11,207,161 B2 | 12/2021 | Brant |
| 11,348,257 B2 | 5/2022 | Lang |
| 11,364,098 B2 | 6/2022 | Falkel |
| 11,553,989 B2 | 1/2023 | Wen et al. |
| 11,583,365 B2 | 2/2023 | Wen |
| 11,638,628 B2 | 5/2023 | Wen |
| 11,663,383 B2 | 5/2023 | Cao |
| 11,707,180 B2 | 7/2023 | Falkel |
| 11,771,524 B2 | 10/2023 | Wen |
| 11,833,006 B2 | 12/2023 | Wen |
| 2001/0002310 A1 | 5/2001 | Chishti et al. |
| 2002/0009686 A1 | 1/2002 | Loc et al. |
| 2002/0010568 A1 | 1/2002 | Rubbert et al. |
| 2002/0025503 A1 | 2/2002 | Chapoulaud et al. |
| 2002/0042038 A1 | 4/2002 | Miller et al. |
| 2002/0051951 A1 | 5/2002 | Chishti et al. |
| 2002/0072027 A1 | 6/2002 | Chisti |
| 2002/0094503 A1 | 7/2002 | Chishti et al. |
| 2002/0110776 A1 | 8/2002 | Abels et al. |
| 2002/0150859 A1 | 11/2002 | Imgrund et al. |
| 2002/0177108 A1 | 11/2002 | Pavlovskaia et al. |
| 2003/0003416 A1 | 1/2003 | Chishti et al. |
| 2003/0008259 A1 | 1/2003 | Kuo et al. |
| 2003/0039940 A1 | 2/2003 | Miller |
| 2003/0059736 A1 | 3/2003 | Lai et al. |
| 2003/0190576 A1 | 10/2003 | Phan et al. |
| 2003/0207224 A1 | 11/2003 | Lotte |
| 2004/0023188 A1 | 2/2004 | Pavlovskaia et al. |
| 2004/0029068 A1 | 2/2004 | Sachdeva et al. |
| 2004/0038168 A1 | 2/2004 | Choi et al. |
| 2004/0134599 A1 | 7/2004 | Wang et al. |
| 2004/0142299 A1 | 7/2004 | Miller |
| 2004/0152036 A1 | 8/2004 | Abolfathi |
| 2004/0166456 A1 | 8/2004 | Chishti et al. |
| 2004/0166462 A1 | 8/2004 | Phan et al. |
| 2004/0166463 A1 | 8/2004 | Wen et al. |
| 2004/0197728 A1 | 10/2004 | Abolfathi et al. |
| 2004/0202983 A1 | 10/2004 | Tricca et al. |
| 2004/0219471 A1* | 11/2004 | Cleary .............. A61C 7/146 433/24 |
| 2004/0229183 A1 | 11/2004 | Knopp et al. |
| 2004/0242987 A1 | 12/2004 | Liew et al. |
| 2004/0253562 A1 | 12/2004 | Knopp |
| 2005/0010450 A1 | 1/2005 | Hultgren et al. |
| 2005/0019721 A1 | 1/2005 | Chishti |
| 2005/0048432 A1 | 3/2005 | Choi et al. |
| 2005/0095552 A1 | 5/2005 | Sporbert et al. |
| 2005/0095562 A1 | 5/2005 | Sporbert et al. |
| 2005/0118555 A1 | 6/2005 | Sporbert et al. |
| 2005/0153255 A1 | 7/2005 | Sporbert et al. |
| 2005/0192835 A1 | 9/2005 | Kuo et al. |
| 2005/0238967 A1 | 10/2005 | Rogers et al. |
| 2005/0241646 A1 | 11/2005 | Sotos et al. |
| 2005/0244781 A1 | 11/2005 | Abels et al. |
| 2005/0244782 A1 | 11/2005 | Chishti et al. |
| 2005/0271996 A1 | 12/2005 | Sporbert et al. |
| 2006/0003283 A1 | 1/2006 | Miller et al. |
| 2006/0035197 A1 | 2/2006 | Hishimoto |
| 2006/0068353 A1 | 3/2006 | Abolfathi et al. |
| 2006/0078840 A1 | 4/2006 | Robson |
| 2006/0078841 A1 | 4/2006 | Desimone et al. |
| 2006/0084030 A1 | 4/2006 | Phan et al. |
| 2006/0093982 A1 | 5/2006 | Wen |
| 2006/0099546 A1 | 5/2006 | Bergersen |
| 2006/0115785 A1 | 6/2006 | Li et al. |
| 2006/0147872 A1 | 7/2006 | Andreiko |
| 2006/0177789 A1 | 8/2006 | O'Bryan |
| 2006/0188834 A1 | 8/2006 | Hilliard |
| 2006/0199142 A1 | 9/2006 | Liu et al. |
| 2006/0223022 A1 | 10/2006 | Solomon |
| 2006/0223023 A1 | 10/2006 | Lai et al. |
| 2006/0275731 A1 | 12/2006 | Wen et al. |
| 2006/0275736 A1 | 12/2006 | Wen et al. |
| 2007/0003907 A1 | 1/2007 | Chishti et al. |
| 2007/0238065 A1 | 10/2007 | Sherwood et al. |
| 2007/0264606 A1 | 11/2007 | Muha et al. |
| 2007/0283967 A1 | 12/2007 | Bailey |
| 2008/0032248 A1 | 2/2008 | Kuo |
| 2008/0044786 A1 | 2/2008 | Kalili |
| 2008/0050692 A1 | 2/2008 | Hilliard |
| 2008/0051650 A1 | 2/2008 | Massie et al. |
| 2008/0057461 A1 | 3/2008 | Cheng et al. |
| 2008/0057462 A1 | 3/2008 | Kitching et al. |
| 2008/0076086 A1 | 3/2008 | Kitching et al. |
| 2008/0085487 A1 | 4/2008 | Kuo et al. |
| 2008/0115791 A1 | 5/2008 | Heine |
| 2008/0118882 A1 | 5/2008 | Su |
| 2008/0141534 A1 | 6/2008 | Hilliard |
| 2008/0182220 A1 | 7/2008 | Chishti et al. |
| 2008/0206702 A1 | 8/2008 | Hedge et al. |
| 2008/0215176 A1 | 9/2008 | Borovinskih et al. |
| 2008/0233528 A1 | 9/2008 | Kim et al. |
| 2008/0233530 A1 | 9/2008 | Cinader |
| 2008/0248438 A1 | 10/2008 | Desimone et al. |
| 2008/0248443 A1 | 10/2008 | Chisti et al. |
| 2008/0261165 A1 | 10/2008 | Steingart et al. |
| 2008/0268400 A1 | 10/2008 | Moss et al. |
| 2008/0280247 A1 | 11/2008 | Sachdeva et al. |
| 2008/0305451 A1 | 12/2008 | Kitching et al. |
| 2008/0305453 A1 | 12/2008 | Kitching et al. |

(56) References Cited

U.S. PATENT DOCUMENTS

| | | |
|---|---|---|
| 2009/0081604 A1 | 3/2009 | Fisher |
| 2009/0117510 A1 | 5/2009 | Minium |
| 2009/0191502 A1 | 7/2009 | Cao et al. |
| 2009/0269714 A1 | 10/2009 | Knopp |
| 2009/0280450 A1 | 11/2009 | Kuo |
| 2009/0291407 A1 | 11/2009 | Kuo |
| 2009/0291408 A1 | 11/2009 | Stone-Collonge et al. |
| 2010/0036682 A1 | 2/2010 | Trosien et al. |
| 2010/0055635 A1 | 3/2010 | Kakavand |
| 2010/0086890 A1 | 4/2010 | Kuo |
| 2010/0138025 A1 | 6/2010 | Morton et al. |
| 2010/0167225 A1 | 7/2010 | Kuo |
| 2010/0173266 A1 | 7/2010 | Lu et al. |
| 2010/0179789 A1 | 7/2010 | Sachdeva et al. |
| 2010/0239992 A1 | 9/2010 | Brandt et al. |
| 2010/0280798 A1 | 11/2010 | Pattijn et al. |
| 2011/0005527 A1 | 1/2011 | Andrew et al. |
| 2011/0015591 A1 | 1/2011 | Hanson et al. |
| 2011/0020761 A1 | 1/2011 | Kalili |
| 2011/0039223 A1 | 2/2011 | Li et al. |
| 2011/0091832 A1 | 4/2011 | Kim et al. |
| 2011/0114100 A1 | 5/2011 | Alvarez et al. |
| 2011/0123944 A1 | 5/2011 | Knopp et al. |
| 2011/0129786 A1 | 6/2011 | Chun et al. |
| 2011/0159451 A1 | 6/2011 | Kuo et al. |
| 2011/0165533 A1 | 7/2011 | Li et al. |
| 2011/0269092 A1 | 11/2011 | Kuo et al. |
| 2011/0269097 A1 | 11/2011 | Sporbert et al. |
| 2011/0270588 A1 | 11/2011 | Kuo et al. |
| 2011/0281229 A1 | 11/2011 | Abolfathi |
| 2012/0035901 A1 | 2/2012 | Kitching et al. |
| 2012/0123577 A1 | 5/2012 | Chapoulaud et al. |
| 2012/0150494 A1 | 6/2012 | Anderson et al. |
| 2012/0186589 A1 | 7/2012 | Singh |
| 2012/0199136 A1 | 8/2012 | Urbano |
| 2012/0214121 A1 | 8/2012 | Greenberg |
| 2012/0225399 A1 | 9/2012 | Teasdale |
| 2012/0225400 A1 | 9/2012 | Chishti et al. |
| 2012/0225401 A1 | 9/2012 | Kitching et al. |
| 2012/0227750 A1 | 9/2012 | Tucker |
| 2012/0244488 A1 | 9/2012 | Chishti et al. |
| 2012/0270173 A1 | 10/2012 | Pumphrey et al. |
| 2012/0288818 A1 | 11/2012 | Vendittelli |
| 2013/0004634 A1 | 1/2013 | McCaskey et al. |
| 2013/0022255 A1 | 1/2013 | Chen et al. |
| 2013/0052625 A1 | 2/2013 | Wagner |
| 2013/0078593 A1 | 3/2013 | Andreiko |
| 2013/0081271 A1 | 4/2013 | Farzin-Nia et al. |
| 2013/0085018 A1 | 4/2013 | Jensen et al. |
| 2013/0095446 A1 | 4/2013 | Andreiko et al. |
| 2013/0122445 A1 | 5/2013 | Marston |
| 2013/0122448 A1 | 5/2013 | Kitching |
| 2013/0157213 A1 | 6/2013 | Arruda |
| 2013/0201450 A1 | 8/2013 | Bailey et al. |
| 2013/0204583 A1 | 8/2013 | Matov et al. |
| 2013/0230819 A1 | 9/2013 | Arruda |
| 2013/0231899 A1 | 9/2013 | Khardekar et al. |
| 2013/0236848 A1 | 9/2013 | Arruda |
| 2013/0266906 A1 | 10/2013 | Soo |
| 2013/0302742 A1 | 11/2013 | Li et al. |
| 2013/0308846 A1 | 11/2013 | Chen et al. |
| 2013/0317800 A1 | 11/2013 | Wu et al. |
| 2013/0323665 A1 | 12/2013 | Dinh et al. |
| 2013/0325431 A1 | 12/2013 | See et al. |
| 2014/0023980 A1 | 1/2014 | Kitching et al. |
| 2014/0067335 A1 | 3/2014 | Andreiko et al. |
| 2014/0072926 A1 | 3/2014 | Valoir |
| 2014/0073212 A1 | 3/2014 | Lee |
| 2014/0076332 A1 | 3/2014 | Luco |
| 2014/0122027 A1 | 5/2014 | Andreiko et al. |
| 2014/0124968 A1 | 5/2014 | Kim |
| 2014/0167300 A1 | 6/2014 | Lee |
| 2014/0172375 A1 | 6/2014 | Grove |
| 2014/0178830 A1 | 6/2014 | Widu |
| 2014/0193765 A1 | 7/2014 | Kitching et al. |
| 2014/0193767 A1 | 7/2014 | Li et al. |
| 2014/0229878 A1 | 8/2014 | Wen et al. |
| 2014/0242532 A1 | 8/2014 | Arruda |
| 2014/0255864 A1 | 9/2014 | Machata et al. |
| 2014/0272757 A1 | 9/2014 | Chishti |
| 2014/0287376 A1 | 9/2014 | Hultgren et al. |
| 2014/0288894 A1 | 9/2014 | Chishti et al. |
| 2014/0315153 A1 | 10/2014 | Kitching |
| 2014/0315154 A1 | 10/2014 | Jung et al. |
| 2014/0329194 A1 | 11/2014 | Sachdeva et al. |
| 2014/0349242 A1 | 11/2014 | Phan et al. |
| 2014/0358497 A1 | 12/2014 | Kuo et al. |
| 2014/0363779 A1 | 12/2014 | Kopelman |
| 2014/0370452 A1 | 12/2014 | Tseng |
| 2015/0004553 A1 | 1/2015 | Li et al. |
| 2015/0004554 A1 | 1/2015 | Cao et al. |
| 2015/0018956 A1 | 1/2015 | Steinmann et al. |
| 2015/0025907 A1 | 1/2015 | Trosien et al. |
| 2015/0044623 A1 | 2/2015 | Rundlett |
| 2015/0044627 A1 | 2/2015 | German |
| 2015/0057983 A1 | 2/2015 | See et al. |
| 2015/0064641 A1 | 3/2015 | Gardner |
| 2015/0093713 A1 | 4/2015 | Chen et al. |
| 2015/0093714 A1 | 4/2015 | Kopelman |
| 2015/0125802 A1 | 5/2015 | Tal |
| 2015/0128421 A1 | 5/2015 | Mason et al. |
| 2015/0157421 A1 | 6/2015 | Martz et al. |
| 2015/0182303 A1 | 7/2015 | Abraham et al. |
| 2015/0182321 A1 | 7/2015 | Karazivan et al. |
| 2015/0216626 A1 | 8/2015 | Ranjbar |
| 2015/0216627 A1 | 8/2015 | Kopelman |
| 2015/0238280 A1 | 8/2015 | Wu et al. |
| 2015/0238282 A1 | 8/2015 | Kuo et al. |
| 2015/0238283 A1 | 8/2015 | Tanugula et al. |
| 2015/0238284 A1 | 8/2015 | Wu et al. |
| 2015/0245887 A1 | 9/2015 | Izugami et al. |
| 2015/0254410 A1 | 9/2015 | Sterental et al. |
| 2015/0265376 A1 | 9/2015 | Kopelman |
| 2015/0289949 A1 | 10/2015 | Moss et al. |
| 2015/0289950 A1 | 10/2015 | Khan |
| 2015/0305830 A1 | 10/2015 | Howard et al. |
| 2015/0305831 A1 | 10/2015 | Cosse |
| 2015/0305919 A1 | 10/2015 | Stubbs et al. |
| 2015/0313687 A1 | 11/2015 | Blees et al. |
| 2015/0320518 A1 | 11/2015 | Namiranian et al. |
| 2015/0320532 A1 | 11/2015 | Matty et al. |
| 2015/0335399 A1 | 11/2015 | Caraballo |
| 2015/0335404 A1 | 11/2015 | Webber et al. |
| 2015/0336299 A1 | 11/2015 | Tanugula et al. |
| 2015/0342464 A1 | 12/2015 | Wundrak et al. |
| 2015/0351870 A1 | 12/2015 | Mah |
| 2015/0351871 A1 | 12/2015 | Chishti et al. |
| 2015/0359609 A1 | 12/2015 | Khan |
| 2015/0366637 A1 | 12/2015 | Kopelman et al. |
| 2015/0366638 A1 | 12/2015 | Kopelman et al. |
| 2016/0000527 A1 | 1/2016 | Arruda |
| 2016/0008095 A1 | 1/2016 | Matov et al. |
| 2016/0008097 A1 | 1/2016 | Chen et al. |
| 2016/0051341 A1 | 2/2016 | Webber |
| 2016/0051342 A1 | 2/2016 | Phan et al. |
| 2016/0051348 A1 | 2/2016 | Boerjes et al. |
| 2016/0067013 A1 | 3/2016 | Morton et al. |
| 2016/0067014 A1 | 3/2016 | Kottemann et al. |
| 2016/0074137 A1 | 3/2016 | Kuo et al. |
| 2016/0074138 A1 | 3/2016 | Kitching et al. |
| 2016/0095668 A1 | 4/2016 | Kuo et al. |
| 2016/0095670 A1* | 4/2016 | Witte .................. A61C 7/002 433/24 |
| 2016/0106521 A1 | 4/2016 | Tanugula et al. |
| 2016/0120617 A1 | 5/2016 | Lee |
| 2016/0120621 A1 | 5/2016 | Li et al. |
| 2016/0128803 A1 | 5/2016 | Webber et al. |
| 2016/0135924 A1 | 5/2016 | Choi et al. |
| 2016/0135925 A1 | 5/2016 | Mason et al. |
| 2016/0135926 A1 | 5/2016 | Djamchidi |
| 2016/0135927 A1 | 5/2016 | Boltunov et al. |
| 2016/0157961 A1 | 6/2016 | Lee |
| 2016/0166363 A1 | 6/2016 | Varsano |
| 2016/0175068 A1 | 6/2016 | Cai et al. |

(56) References Cited

U.S. PATENT DOCUMENTS

| | | |
|---|---|---|
| 2016/0175069 A1 | 6/2016 | Korytov et al. |
| 2016/0184129 A1 | 6/2016 | Liptak et al. |
| 2016/0193014 A1 | 7/2016 | Morton et al. |
| 2016/0199216 A1 | 7/2016 | Cam et al. |
| 2016/0203604 A1 | 7/2016 | Gupta et al. |
| 2016/0206402 A1 | 7/2016 | Kitching et al. |
| 2016/0220200 A1 | 8/2016 | Sanholm et al. |
| 2016/0228213 A1 | 8/2016 | Tod et al. |
| 2016/0256240 A1 | 9/2016 | Shivapuja et al. |
| 2016/0310235 A1 | 10/2016 | Derakhshan et al. |
| 2016/0338799 A1 | 11/2016 | Wu et al. |
| 2016/0367339 A1 | 12/2016 | Khardekar et al. |
| 2017/0007359 A1 | 1/2017 | Kopelman et al. |
| 2017/0065373 A1 | 3/2017 | Martz et al. |
| 2017/0079748 A1 | 3/2017 | Andreiko |
| 2017/0100207 A1 | 4/2017 | Wen |
| 2017/0100208 A1 | 4/2017 | Wen |
| 2017/0100209 A1 | 4/2017 | Wen |
| 2017/0100210 A1 | 4/2017 | Wen |
| 2017/0100211 A1 | 4/2017 | Wen |
| 2017/0100214 A1 | 4/2017 | Wen |
| 2017/0224444 A1 | 8/2017 | Viecilli et al. |
| 2017/0231721 A1 | 8/2017 | Akeel et al. |
| 2017/0325911 A1 | 11/2017 | Marshall |
| 2018/0014912 A1 | 1/2018 | Radmand |
| 2018/0028065 A1 | 2/2018 | Elbaz et al. |
| 2018/0042708 A1 | 2/2018 | Caron et al. |
| 2018/0055611 A1 | 3/2018 | Sun et al. |
| 2018/0078335 A1 | 3/2018 | Falkel |
| 2018/0078343 A1 | 3/2018 | Falkel |
| 2018/0078344 A1 | 3/2018 | Falkel |
| 2018/0078347 A1 | 3/2018 | Falkel |
| 2018/0092714 A1 | 4/2018 | Kitching et al. |
| 2018/0092715 A1 | 4/2018 | Kitching et al. |
| 2018/0125610 A1 | 5/2018 | Carrier, Jr. et al. |
| 2018/0158544 A1 | 6/2018 | Trosien et al. |
| 2018/0161126 A1 | 6/2018 | Marshall et al. |
| 2018/0168781 A1 | 6/2018 | Kopelman et al. |
| 2018/0174367 A1 | 6/2018 | Marom et al. |
| 2018/0333226 A1 | 11/2018 | Tsai et al. |
| 2018/0344431 A1 * | 12/2018 | Kuo .................. A61C 7/146 |
| 2019/0008612 A1 | 1/2019 | Kitching et al. |
| 2019/0046297 A1 | 2/2019 | Kopelman et al. |
| 2019/0090987 A1 | 3/2019 | Hung |
| 2019/0231478 A1 | 8/2019 | Kopelman |
| 2019/0321135 A1 | 10/2019 | Wen |
| 2019/0343602 A1 | 11/2019 | Wen |
| 2019/0350680 A1 | 11/2019 | Chekh et al. |
| 2019/0358002 A1 | 11/2019 | Falkel |
| 2019/0388189 A1 | 12/2019 | Shivapuja et al. |
| 2020/0000552 A1 | 1/2020 | Mednikov et al. |
| 2020/0047868 A1 | 2/2020 | Young et al. |
| 2020/0081413 A1 | 3/2020 | Georg et al. |
| 2020/0105028 A1 | 4/2020 | Gao et al. |
| 2020/0146775 A1 | 5/2020 | Wen |
| 2020/0170762 A1 | 6/2020 | Falkel |
| 2020/0205936 A1 | 7/2020 | Wen |
| 2020/0214801 A1 | 7/2020 | Wang et al. |
| 2020/0253693 A1 | 8/2020 | Wen |
| 2020/0316856 A1 | 10/2020 | Mojdeh et al. |
| 2020/0357186 A1 | 11/2020 | Pokotilov et al. |
| 2020/0360120 A1 | 11/2020 | Inoue et al. |
| 2021/0106404 A1 | 4/2021 | Wen |
| 2021/0153981 A1 | 5/2021 | Falkel |
| 2021/0186668 A1 | 6/2021 | Falkel |
| 2021/0244518 A1 | 8/2021 | Ryu et al. |
| 2021/0282899 A1 | 9/2021 | Wen |
| 2021/0369417 A1 | 12/2021 | Wen et al. |
| 2021/0393376 A1 | 12/2021 | Wu et al. |
| 2022/0054232 A1 | 2/2022 | Wen et al. |
| 2022/0265395 A1 | 8/2022 | Falkel |
| 2022/0266577 A1 | 8/2022 | Sharma et al. |
| 2022/0323182 A1 * | 10/2022 | Lee .................. A61C 7/02 |
| 2022/0409338 A1 | 12/2022 | Cao |
| 2023/0053766 A1 | 2/2023 | Cao et al. |
| 2023/0058890 A1 | 2/2023 | Kenworthy |
| 2023/0233288 A1 | 7/2023 | Wen |
| 2023/0240808 A1 | 8/2023 | Schueller et al. |
| 2023/0320565 A1 | 10/2023 | Falkel |
| 2023/0380936 A1 | 11/2023 | Wen |
| 2023/0380938 A1 | 11/2023 | Sharma et al. |
| 2023/0380939 A1 | 11/2023 | Lai et al. |
| 2023/0414324 A1 | 12/2023 | Wen |

FOREIGN PATENT DOCUMENTS

| | | | |
|---|---|---|---|
| CN | 1997324 | 7/2007 | |
| CN | 101427256 | 5/2009 | |
| CN | 101636122 | 1/2010 | |
| CN | 1973291 | 9/2010 | |
| CN | 102438545 | 5/2012 | |
| CN | 101528152 | 12/2012 | |
| CN | 103932807 * | 7/2014 | ............... A61C 7/00 |
| CN | 105748163 | 7/2016 | |
| CN | 106580509 | 4/2017 | |
| EP | 1474062 | 4/2011 | |
| EP | 2056734 | 9/2015 | |
| EP | 2957252 | 12/2015 | |
| HK | 40004866 B | 8/2022 | |
| JP | 2005-515826 | 6/2005 | |
| JP | 2006-500999 | 1/2006 | |
| JP | 2008-532563 | 8/2008 | |
| JP | 2009-202031 | 9/2009 | |
| JP | 4323322 | 9/2009 | |
| JP | 2010-502246 | 1/2010 | |
| JP | 2010-528748 | 8/2010 | |
| JP | 4566746 | 10/2010 | |
| JP | 2012-139540 | 7/2012 | |
| JP | 5015197 | 8/2012 | |
| JP | 5015765 | 8/2012 | |
| JP | 5149898 | 2/2013 | |
| JP | 2013-081785 | 5/2013 | |
| JP | 5291218 | 9/2013 | |
| JP | 2007-525289 | 9/2017 | |
| JP | 2019-013463 | 1/2019 | |
| JP | 2019-529042 | 10/2019 | |
| JP | 2019-537033 | 12/2019 | |
| KR | 200446323 Y1 * | 10/2009 | ............... A61C 7/14 |
| KR | 10-1450866 | 10/2014 | |
| KR | 2018-0090481 | 8/2018 | |
| WO | WO 2001/082192 | 11/2001 | |
| WO | WO 2002/047571 | 6/2002 | |
| WO | WO 2003/063721 | 8/2003 | |
| WO | WO 2004/028391 | 4/2004 | |
| WO | WO 2005/086058 | 9/2005 | |
| WO | WO 2004/098379 | 11/2005 | |
| WO | WO 2006/050452 | 5/2006 | |
| WO | WO 2006/096558 | 9/2006 | |
| WO | WO 2008/026064 | 3/2008 | |
| WO | WO 2008/102132 | 8/2008 | |
| WO | WO 2008/118546 | 10/2008 | |
| WO | WO 2008/149222 | 12/2008 | |
| WO | WO 2009/057937 | 5/2009 | |
| WO | WO 2009/068892 | 6/2009 | |
| WO | WO 2016/004415 | 1/2016 | |
| WO | WO 2016/100577 | 6/2016 | |
| WO | WO 2017/062207 | 4/2017 | |
| WO | WO 2017/062208 | 4/2017 | |
| WO | WO 2017/062209 | 4/2017 | |
| WO | WO 2017/062210 | 4/2017 | |
| WO | WO 2018/057622 | 3/2018 | |
| WO | WO 2018/112273 | 6/2018 | |
| WO | WO 2018/118200 | 6/2018 | |
| WO | WO 2020/222905 | 11/2020 | |
| WO | WO 2020/223384 | 11/2020 | |
| WO | WO 2021/105878 | 6/2021 | |
| WO | WO 2021/247145 | 12/2021 | |
| WO | WO 2021/247950 | 12/2021 | |
| WO | WO 2022/040671 | 2/2022 | |
| WO | WO 2022/178514 | 8/2022 | |
| WO | WO 2023/023417 | 2/2023 | |

(56) References Cited

FOREIGN PATENT DOCUMENTS

| WO | WO 2023/023418 | 2/2023 |
| WO | WO 2023/230460 | 11/2023 |

OTHER PUBLICATIONS

CN103932807A (Wuxi EA Medical Instr Technologies Ltd) Method for acquiring tooth target orthodontics state, method for producing tooth corrector and tooth corrector thereof, Jul. 23, 2014. [retrieved on Mar. 21, 2022], Translation retrieved from: Espacenet (Year: 2014).*
"Contiguous." Definition [online]. Merriam-Webster [retrieved on Jul. 18, 2023]. Retrieved from Merriam-Webster.com Dictionary, <URL:https://www.merriam-webster.com/dictionary/contiguous> (Year: 2023).*
Kovach, I. V. et al., "Clinic, diagnosis, treatment, prevention, prosthetics various dentofacial anomalies and deformities," DMA, 2018.
U.S. Appl. No. 15/230,139, filed Aug. 5, 2016.
U.S. Appl. No. 15/230,170, filed Aug. 5, 2016.
U.S. Appl. No. 15/230,193, filed Aug. 5, 2016.
U.S. Appl. No. 15/230,216, filed Aug. 5, 2016.
U.S. Appl. No. 15/230,251, filed Aug. 5, 2016.
U.S. Appl. No. 15/386,280, filed Dec. 21, 2016.
U.S. Appl. No. 15/710,469, filed Sep. 20, 2017.
U.S. Appl. No. 15/710,604, filed Sep. 20, 2017.
U.S. Appl. No. 15/710,666, filed Sep. 20, 2017.
U.S. Appl. No. 15/710,703, filed Sep. 20, 2017.
U.S. Appl. No. 16/410,368, filed May 13, 2019.
U.S. Appl. No. 16/423,840, filed May 28, 2019.
U.S. Appl. No. 16/435,028, filed Jun. 7, 2019.
U.S. Appl. No. 16/657,639, filed Oct. 18, 2019.
U.S. Appl. No. 16/735,983, filed Jan. 7, 2020.
U.S. Appl. No. 16/783,055, filed Feb. 5, 2020.
U.S. Appl. No. 16/799,046, filed Feb. 24, 2020.
U.S. Appl. No. 16/803,184, filed Feb. 27, 2020.
U.S. Appl. No. 17/130,384, filed Dec. 22, 2020.
U.S. Appl. No. 17/162,748, filed Jan. 29, 2021.
U.S. Appl. No. 17/176,835, filed Feb. 16, 2021.
U.S. Appl. No. 17/228,406, filed Apr. 12, 2021.
U.S. Appl. No. 17/337,157, filed Jun. 2, 2021.
U.S. Appl. No. 17/404,894, filed Aug. 17, 2021.
U.S. Appl. No. 17/462,198, filed Aug. 31, 2021.
U.S. Appl. No. 17/651,382, filed Feb. 16, 2022.
U.S. Appl. No. 17/658,183, filed Apr. 6, 2022.
U.S. Appl. No. 17/662,819, filed May 10, 2022.
U.S. Appl. No. 17/664,777, filed May 24, 2022.
U.S. Appl. No. 17/664,854, filed May 24, 2022.

* cited by examiner

INDIRECT BONDING TRAY SYSTEM

CROSS-REFERENCE TO RELATED APPLICATIONS

This application claims the benefit of priority to U.S. Prov. Pat. App. 62/840,559 filed Apr. 30, 2019, which is incorporated herein by reference in its entirety.

FIELD OF THE INVENTION

The present invention relates to methods and apparatus for orthodontics. More particularly, the present invention relates to methods and apparatus for the positioning of orthodontic brackets upon teeth using indirect bonding trays and facilitating the removal of the trays in orthodontic treatments.

BACKGROUND OF THE INVENTION

Orthodontics is a specialty of dentistry that is concerned with the study and treatment of malocclusions which can result from tooth irregularities, disproportionate facial skeleton relationships, or both. Orthodontics treats malocclusion through the displacement of teeth via bony remodeling and control and modification of facial growth.

A typical treatment generally involves the placement and positioning of braces upon the teeth of a patient for the purpose of applying a static mechanical force to induce bone remodeling, thereby enabling teeth to move. Braces utilize orthodontic brackets affixed to each tooth and an archwire interface interfacing with each of the brackets. As the teeth respond to the pressure applied via the archwire by shifting their positions, the wires are again tightened to apply additional pressure. Each of the brackets are typically aligned in a pre-planned location on each tooth to ensure that tightening of the archwire will result in a desirable tooth movement. While the brackets may be manually positioned and secured to each respective tooth, this is a time-consuming process.

Orthodontists and other practitioners may utilize a flexible orthodontic appliance called an indirect bonding tray which enables the practitioner to load an entire arch of brackets into the tray, then quickly transfer those brackets onto the dentition in their planned positions. These trays may be created by utilizing a positive mold of a patient's dentition which may be created from an orthodontic 3D scan. Hence the tray may be customized to each particular patient's dentition. These trays may also be transparent to allow for the practitioner to use to curing light to cement the entire arch of brackets simultaneously.

However, there are also deficiencies with many of these indirect bonding tray systems. For instance, some trays may not yield the adequate resolution to provide for accurate placement of the brackets upon the teeth. Many of the trays may provide for inadequate space for clearing of excess adhesive used in securing the brackets to the teeth surface. Furthermore, many trays result in bonding failures between the bracket and teeth surface when attempting to remove the tray from the dentition. These bonding failures may be aggravated by the presence of protrusions such as integral hooks (such as an integral ball hook) or hooks for banding which extend from the bracket away from the arch wire slot which may make tray removal difficult.

Accordingly, there exists a need for an efficient and effective indirect bonding tray which facilitates placement of orthodontic brackets.

SUMMARY OF THE INVENTION

Indirect bonding (IDB) trays may be used for the placement of orthodontic brackets in a controlled manner to minimize the risk of bracket placement errors and to facilitate the bonding process. The IDB trays described herein may also be used with any number of other teeth planning treatment systems such as those produced by Align Technologies, Inc. (San Jose, CA).

One variation of the IDB tray may have a number of individual modules connected to any number of adjacent modules in series to form a partial or complete arch depending upon the number of teeth upon which a bracket is to be bonded. Each of the modules may define a receiving channel within which a bracket may be placed prior to attachment to the tooth surface and the modules may be attached to one another via one or more coupling members which may be pre-formed to readily break when a force is applied.

Because the individual modules may be formed for each crown that mates to a respective tooth using, e.g., buccal, lingual, and/or occlusal surfaces, any number of individual modules may be removed from the IDB tray depending upon the number of brackets to be applied. Thus, a single IDB tray may be broken apart via the coupling members to leave at least one individual module for use or one or more individual modules which may or may not be attached to one another for use, e.g., over different parts of the patient's dentition.

It is along the occlusal surface of the IDB tray that the individual modules are coupled to one another via a corresponding coupling member. If the practitioner desires bonding for fewer crowns, or if the crowns have moved since the patient's last visit, the coupling member can be cut or broken by hand to allow for modular crown bonding individually, as part of a subset, or as the full set of brackets. The coupling members may accordingly be formed to have a relative low thickness, e.g., 0.002 in., or they may be pre-formed with a weakened cross-section having recesses, notches, etc.

Each of the individual modules may incorporate a corresponding reinforcing tab which extends in apposition to each module and functions as a gripping or securement backstop to hold an individual module in position upon the patient's tooth or teeth. The reinforcing tab may extend, e.g., in parallel, with the individual module so that when the module is positioned upon a buccal surface of the tooth with a bracket, the reinforcing tab may extend at least partially or a full length upon a lingual surface of the same tooth to hold the module in position over the buccal surface.

Additionally, each of the individual modules may further incorporate a corresponding removal tab which may extend from the individual module and reinforcing tab away from the buccal surface and parallel with the occlusal surface of the tooth or teeth such that the removal tab is transversely positioned relative to the module, e.g., along the lingual-buccal axis of the crown. Each of the modules may incorporate a removal tab yet the lengths of the tab may be varied for one or more of the modules or the tabs may be uniform in length between each module. In either case, the tab may have a length sufficient for the user to grasp or hold either manually or via a grasping instrument such as forceps.

An individual module blank may be selected depending upon the crown for bonding upon. For instance, the module may be formed to be relatively wider and longer for placement upon molar and premolar crowns. Modules which are designed for placement over incisors and bicuspids may be formed to have a relatively narrower width and shorter length. The IDB tray may be formed such that each of the individual modules near their respective occlusal surfaces are formed to a common height (z-height) for easy and fast 3D printing.

The brackets to be bonded to the surface of the teeth may be placed within their respective receiving channels with their bonding surfaces positioned to be placed along the buccal side of the tooth or teeth. In other variations, a different geometry may be employed where the individual modules are positioned along the lingual side of the dentition such that the respective receiving channels are positioned on the lingual side to allow for lingual bracket placement.

The IDB tray may be formed of a transparent polymeric material which may allow for, e.g., a UV light, to be shined through the modules once the IDB tray and respective brackets are in position over the patient's dentition. This may allow for the bonding agent to be cured through the IDB tray to ensure that the brackets are maintained in their relative positions over the surface.

While the IDB tray may be formed into a full arch which extends over the entirety of the patient's teeth, one or more individual modules may be utilized by breaking the coupling members corresponding to one or both sides of the individual module or modules. The occlusal side of the IDB tray may be seen upon the dentition such that they are positioned directly above the occlusal surfaces of the teeth. Moreover, the occlusal surface of the IDB tray may have a flattened surface between each of the individual modules for printing or forming purposes. However, the IDB tray may be formed to have surfaces with alternative geometries, as desired.

Moreover, the removal tabs of each individual module may be seen extending away from their respective buccal surfaces and towards the interior of the arch. The removal tabs may extend inwardly of the arch in parallel with the occlusal plane and transverse to the individual modules. The respective reinforcing tabs may also extend in parallel with the individual modules such that they may extend at least partially along the lingual surfaces of each respective tooth or teeth. The reinforcing tabs may be swapped in position with the module such that the module is positioned into contact against the lingual surface and the reinforcing tab is positioned into contact against the buccal surface.

The individual modules may be formed with a break joint located in the region where the occlusal surface of the module meets the buccal portion of the module. The break joint may be formed, e.g., by a pre-formed grooves, notches, or cuts which may be varied according to a length of the occlusal extrusion. A boolean subtraction may be performed using the patient's crowns as the cutting body to create the buccal, occlusal, and lingual mating surfaces for each unit. These break joints may be formed to be easily breakable or bendable to facilitate the removal of the IDB tray or individual module from the dentition once the bracket has been bonded to the underlying tooth surface, as described in further detail herein.

The bracket may be positioned within the receiving channel bonded to the underlying buccal surface. The break joint may be formed as a weakened portion of where the occlusal plane meets the buccal plane of the module and the removal tab may be seen extending away from the buccal surface and inwards towards the arch. Once the bracket has been sufficiently bonded and the module is ready to be removed from the dentition, the removal tab may be urged or lifted away from the occlusal surface of the underlying tooth and rotated in the direction as denoted such that the removal tab rotates about the break joint which may function as a pivot.

As the removal tab is further lifted and rotated about break joint, the break joint may begin to yield or partially break such that the module may be lifted away in a normal direction away from the buccal surface. The lifting or removal of the module away from the bracket in the normal direction prevents the module from pushing upon the bracket or catching any portion of the bracket (such as any integral hooks which may project away from the bracket). This may prevent displacement of the bracket upon the bonded surface and may also prevent damage to any portion of the bracket during module removal from the dentition.

Yet another variation of the individual module may be formed with a recessed portion defined along a pivot portion formed where the occlusal plane meets the buccal plane of the module. Here, the recessed portion may allow for access to the space in proximity to where the bracket is bonded. This recessed portion may also provide for a relatively thinned pivot portion which may enable the portion to bend or break when the removal tab is lifted to remove the module from the dentition and adhered bracket. Removal of the individual module or IDB tray may be performed in the same or similar manner as described herein.

In addition to providing a pivoting portion for removal, the recessed portion may also provide access to the tooth surface in proximity to the bracket. When the bracket is adhered upon the surface, excess adhesive may spread over the surface away from the bonded bracket. This excess adhesive often spreads between the tooth surface and portions of the module. However, the recessed portion may allow for a distal tip of a cleaning instrument to be inserted within the portion for cleaning any of the excess adhesive when the IDB module is positioned upon the dentition after adhesion of the brackets to their respective surfaces.

In one embodiment of the indirect bonding tray apparatus, the apparatus may generally comprise one or more individual modules each defining a receiving channel and configured for placement upon a dentition of a subject. A removal tab having a length may extend transversely relative to the individual module and a pivoting portion may be located away from the removal tab such that the removal tab is rotatable about the pivoting portion.

In one embodiment for a method of removing the indirect bonding tray apparatus from a dentition of a subject, the method may generally comprise engaging a removal tab having a length which extends transversely relative to an individual module and inwardly of an arch of the dentition, urging the removal tab to rotate about a pivoting portion located away from the removal tab, and urging a receiving channel of the individual module to lift away in a normal direction away from a buccal surface of the tooth.

DETAILED DESCRIPTION OF THE INVENTION

An indirect bonding (IDB) tray may be used for the placement of orthodontic brackets in a controlled manner to minimize the risk of bracket placement errors and to facilitate the bonding process. The IDB tray may formed through any number of fabrication processes (e.g., 3D printing, thermal forming, etc.) and the tray may be designed utilizing automated design software and forming processes such as those developed by uLab Systems, Inc. (Redwood City, CA) and further described in U.S. Pat. Pubs. 2017/0100207; 2017/0100208; 2017/0100209; 2017/0100210; 2017/0100211; 2018/0078347; 2018/0078343; 2018/0078344; 2018/0078335; 2017/0100214, each of which is incorporated herein by reference in its entirety. The IDB trays described herein may also be used with any number of other teeth planning treatment systems such as those produced by Align Technologies, Inc. (San Jose, CA).

Figure 1A:
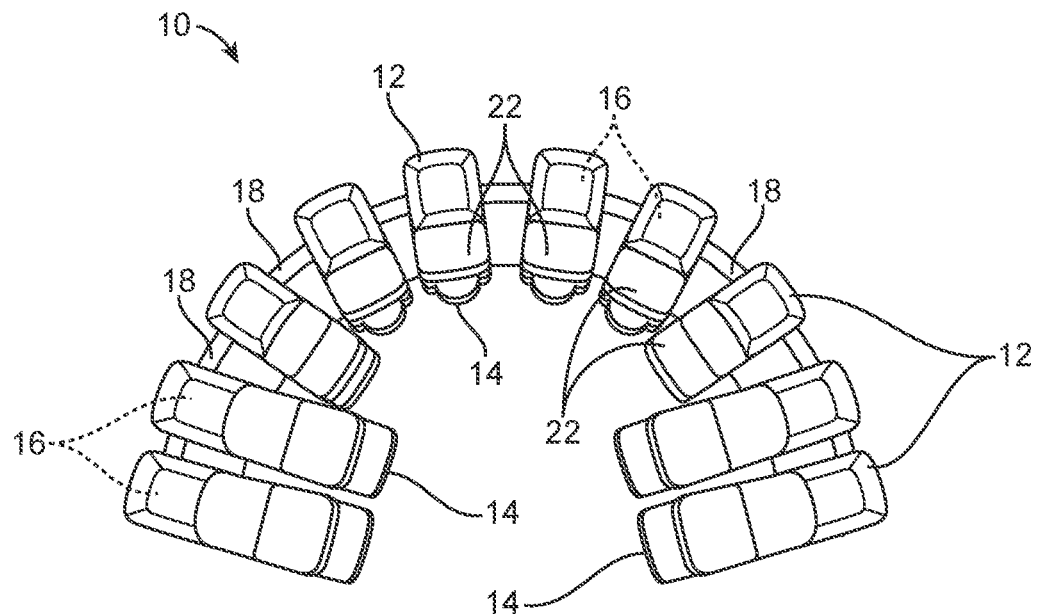
FIGS. 1A and 1B show bottom and perspective views of one variation of an IDB tray formed into a full arch configuration.
Figure 1B:
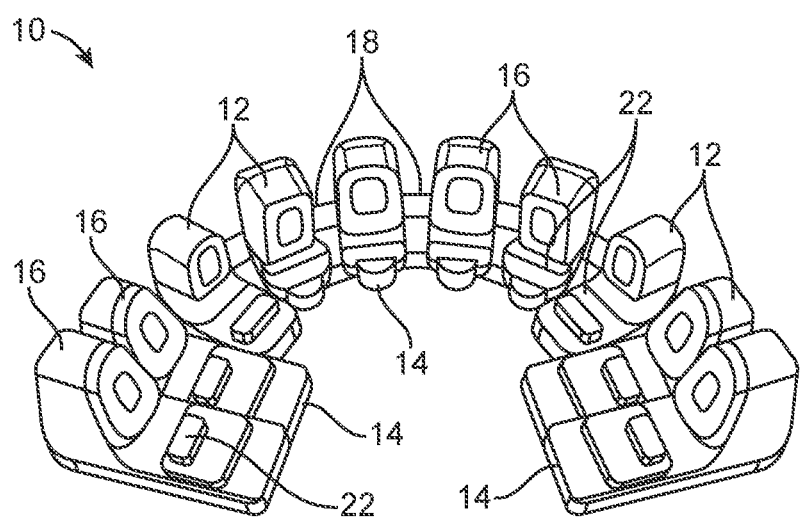

One variation of the IDB tray is shown in the bottom and perspective views of FIGS. 1A and 1B which illustrate an IDB tray 10 having a number of individual modules 12. The individual modules 12 may be connected to any number of adjacent modules in series to form a partial or complete arch depending upon the number of teeth upon which a bracket is to be bonded. Each of the modules 12 may define a receiving channel 16 within which a bracket may be placed prior to attachment to the tooth surface and the modules 12 may be attached to one another via one or more coupling members 18 which may be pre-formed to readily break when a force is applied.

Because the individual modules 12 may be formed for each crown that mates to a respective tooth using, e.g., buccal, lingual, and/or occlusal surfaces, any number of individual modules 12 may be removed from the IDB tray 10 depending upon the number of brackets to be applied. Thus, a single IDB tray 10 may be broken apart via the coupling members 18 to leave at least one individual module 12 for use or one or more individual modules 12 which may or may not be attached to one another for use, e.g., over different parts of the patient's dentition.

It is along the occlusal surface of the IDB tray 10 that the individual modules 12 are coupled to one another via a corresponding coupling member 18. If the practitioner desires bonding for fewer crowns, or if the crowns have moved since the patient's last visit, the coupling member 18 can be cut or broken by hand to allow for modular crown bonding individually, as part of a subset, or as the full set of brackets. The coupling members 18 may accordingly be formed to have a relative low thickness, e.g., 0.002 in., or they may be pre-formed with a weakened cross-section having recesses, notches, etc.

Each of the individual modules 12 may incorporate a corresponding reinforcing tab 22 which extends in apposition to each module 12 and functions as a gripping or securement backstop to hold an individual module 12 in position upon the patient's tooth or teeth. The reinforcing tab 22 may extend, e.g., in parallel, with the individual module 12 so that when the module 12 is positioned upon a buccal surface of the tooth with a bracket, the reinforcing tab 22 may extend at least partially or a full length upon a lingual surface of the same tooth to hold the module 12 in position over the buccal surface.

Figure 5A:
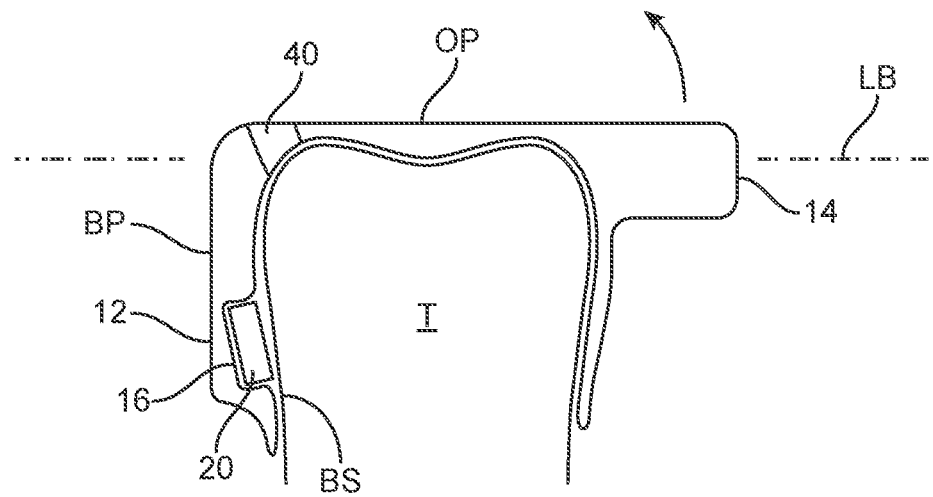
FIGS. 5A and 5B show cross-sectional side views of one example illustrating how the one or more modules or the entire IDB tray may be removed from the patient's dentition without inducing a bonding failure of the bracket or damaging the bracket.

Additionally, each of the individual modules 12 may further incorporate a corresponding removal tab 14 which may extend from the individual module 12 and reinforcing tab 22 away from the buccal surface and parallel with the occlusal surface of the tooth or teeth such that the removal tab 14 is transversely positioned relative to the module 12, e.g., along the lingual-buccal axis LB of the crown (e.g., as shown in FIG. 5A below). Each of the modules 12 may incorporate a removal tab 14 yet the lengths of the tab 14 may be varied for one or more of the modules 12 or the tabs 14 may be uniform in length between each module 12. In either case, the tab 14 may have a length, e.g., 3 to 4 mm, sufficient for the user to grasp or hold either manually or via a grasping instrument such as forceps.

An individual module 12 blank may be selected depending upon the crown for bonding upon. Also, the individual modules 12 may vary in size depending upon the location of the module upon the dentition. Modules 12 located posteriorly for placement upon, e.g., rear molars, may be dimensioned differently from modules 12 which are located anteriorly for placement upon, e.g., incisors. For instance, the rear module 12 for placement upon a molar may be formed to be relatively wider and longer, e.g., 15 to 20 mm in length and 5 to 8 mm in width, for placement upon molar and premolar crowns. Modules 12 which are designed for placement over incisors and bicuspids may be formed to have a width and length, e.g., 10 to 15 mm in length and 3 to 7 mm in width. The IDB tray 10 may be formed such that each of the individual modules 12 near their respective occlusal surfaces are formed to a common height (z-height) for easy and fast 3D printing.

Figure 2A:
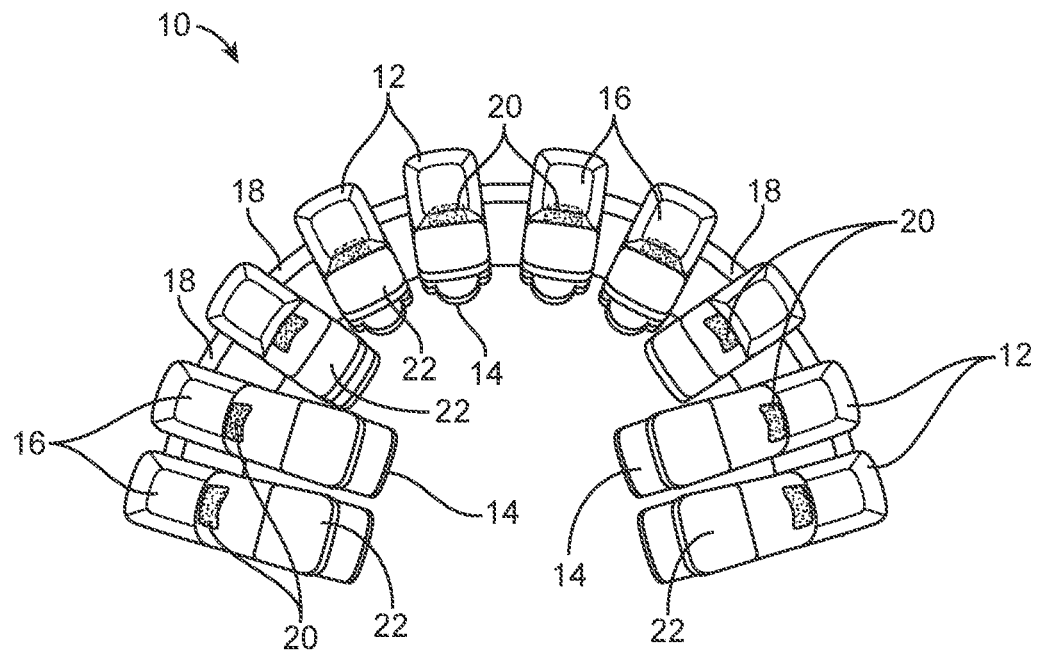
FIGS. 2A and 2B show bottom and perspective views of the variation from FIGS. 1A and 1B having brackets positioned within their individual receiving channels for bonding to a respective tooth surface.
Figure 2B:
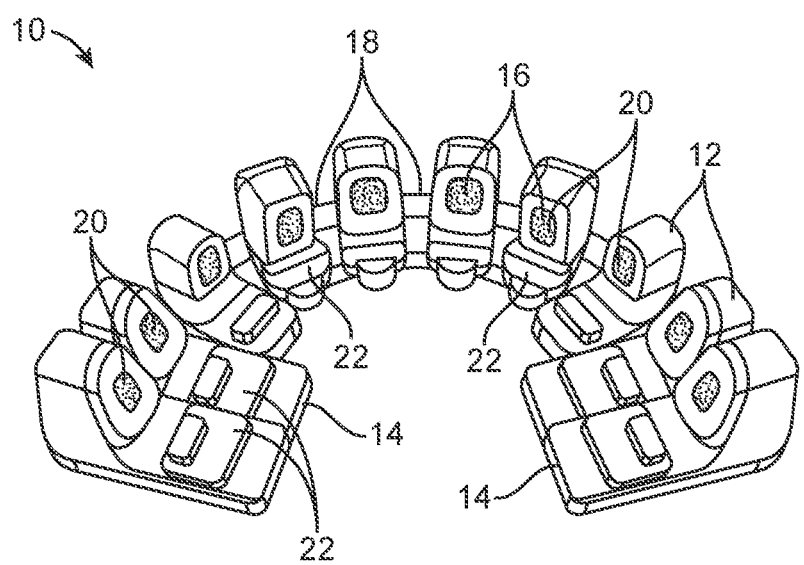

As shown in the bottom and perspective views of FIGS. 2A and 2B, the brackets 20 to be bonded to the surface of the teeth may be placed within their respective receiving channels 16 with their bonding surfaces positioned to be placed along the buccal side of the tooth or teeth. In other variations, a different geometry may be employed where the individual modules 12 are positioned along the lingual side of the dentition such that the respective receiving channels 16 are positioned on the lingual side to allow for lingual bracket placement.

As further shown, the IDB tray 10 may be formed of a transparent polymeric material which may allow for, e.g., a UV light, to be shined through the modules 12 once the IDB tray 10 and respective brackets 20 are in position over the patient's dentition. This may allow for the bonding agent to be cured through the IDB tray 10 to ensure that the brackets 20 are maintained in their relative positions over the surface.

Figure 3A:
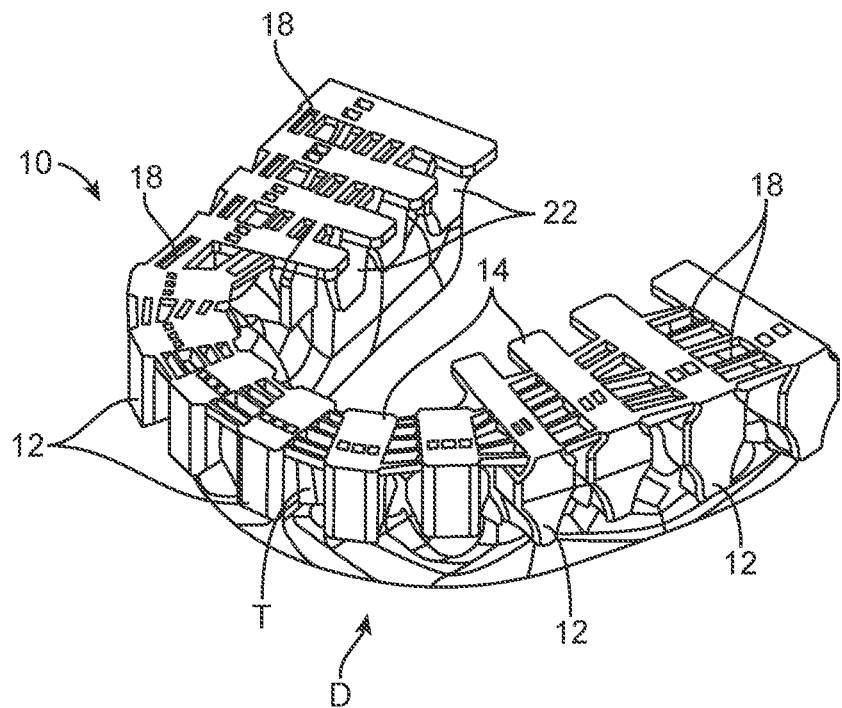
FIGS. 3A and 3B show perspective and top views of another variation of the IDB tray positioned upon the dentition of a patient.
Figure 3B:
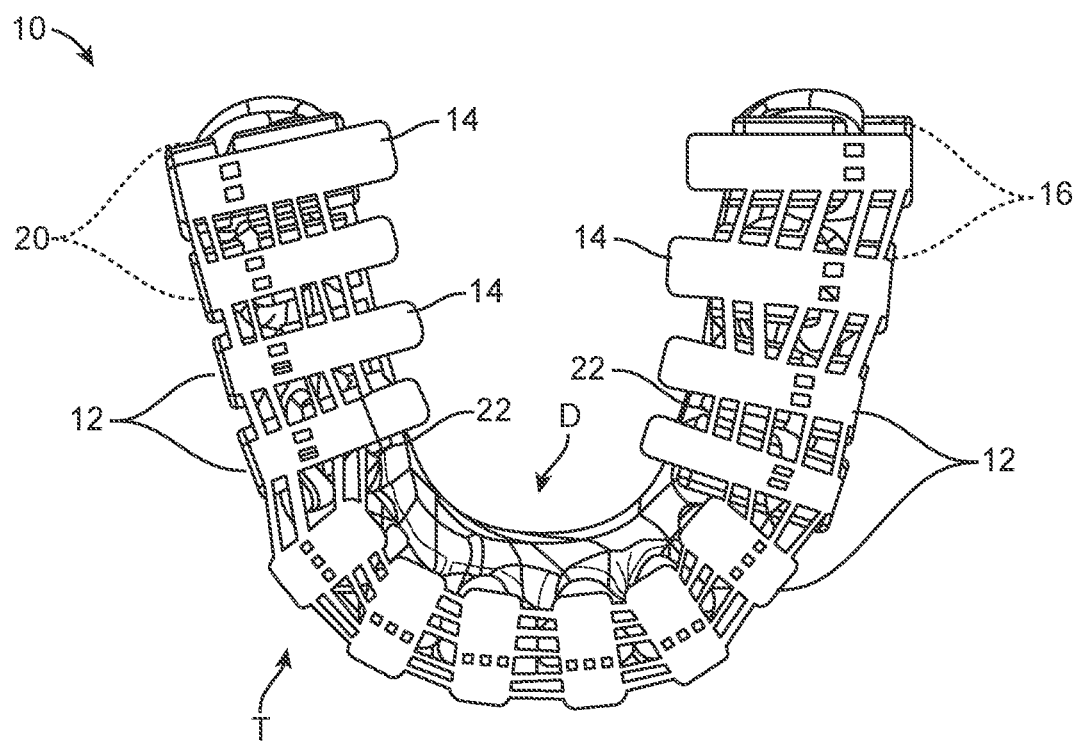

FIGS. 3A and 3B show examples of how the IDB tray 10 may be positioned upon the patient's dentition D for placing and securing the brackets 20. While the IDB tray 10 is illustrated as having a full arch which extends over the entirety of the patient's teeth T, one or more individual modules 12 may be utilized by breaking the coupling members 18 corresponding to one or both sides of the individual module or modules 12, as described herein. The occlusal side of the IDB tray 10 may be seen upon the dentition T such that they are positioned directly above the occlusal surfaces of the teeth T. Moreover, the occlusal surface of the IDB tray 10 is shown as having a flattened surface between each of the individual modules 12 for printing or forming purposes. However, the IDB tray 10 may be formed to have surfaces with alternative geometries, as desired.

Figure 3C:
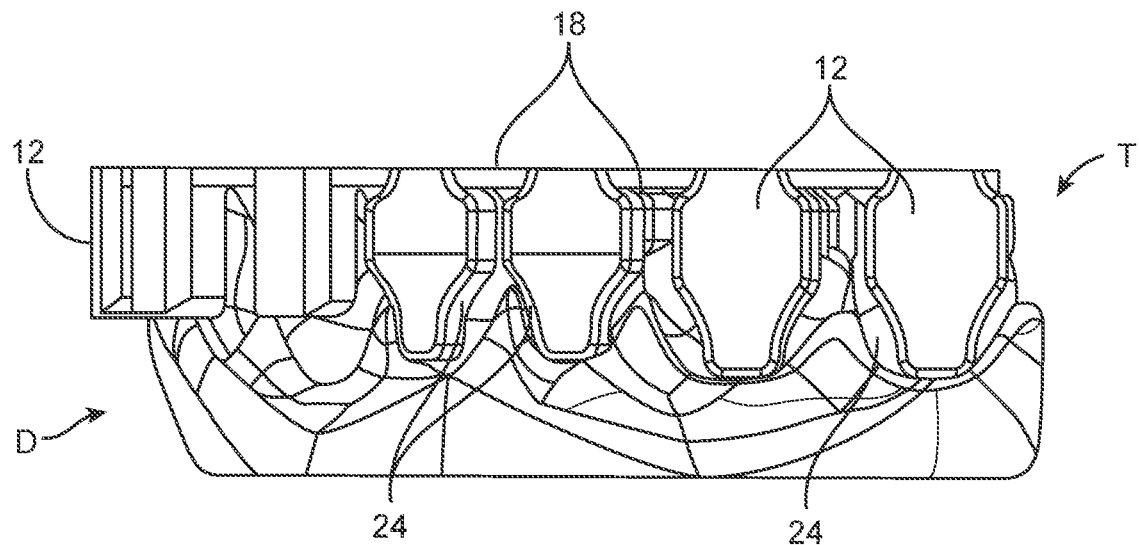
FIGS. 3C, 3D, and 3E show respective side, back, and cross-sectional side views of the IDB tray placed upon the dentition.
Figure 3D:
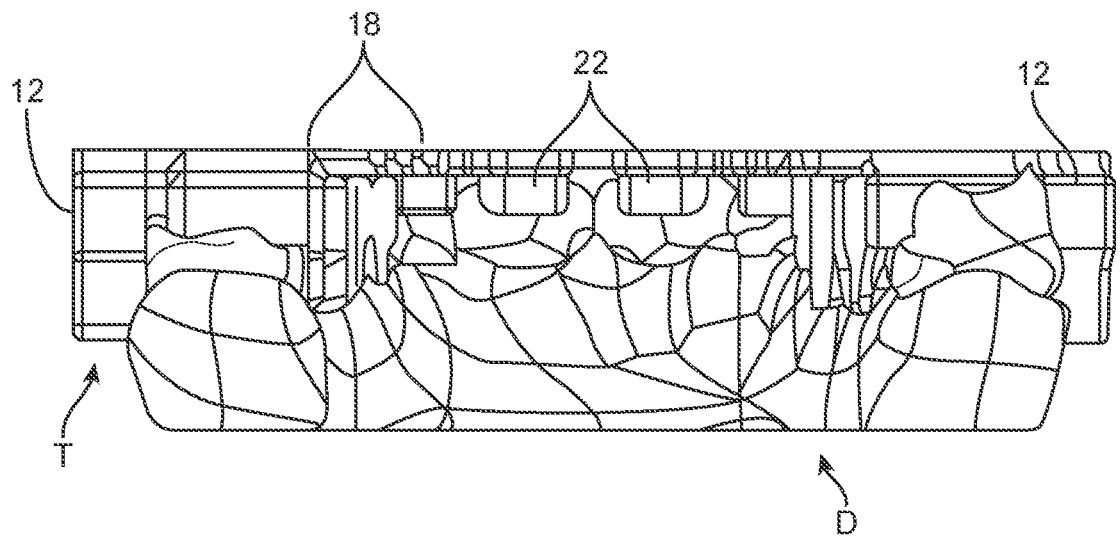
Figure 3E:
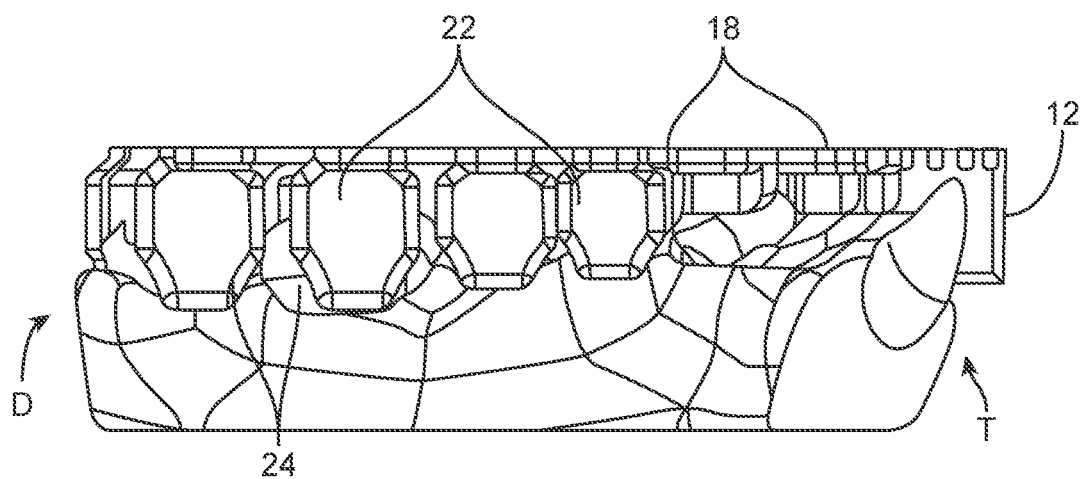

Moreover, the removal tabs 14 of each individual module 12 may be seen extending away from their respective buccal surfaces and towards the interior of the arch. FIGS. 3C, 3D, and 3E show respective side, back, and cross-sectional side views of the IDB tray 10 placed upon the dentition D. FIGS. 3D and 3E in particular illustrate how the removal tabs 14 may extend inwardly of the arch in parallel with the occlusal plane and transverse to the individual modules 12. The respective reinforcing tabs 22 may also be seen extending in parallel with the individual modules 12 such that they may extend at least partially along the lingual surfaces of each respective tooth or teeth. As noted herein, the reinforcing tabs 22 may be swapped in position with the module 12 such that the module 12 is positioned into contact against the lingual surface and the reinforcing tab 22 is positioned into contact against the buccal surface.

Additionally, one or more of the modules 12 may be formed to have a reduced profile by removing excess material or forming the module 12 with the reduced profile between adjacent modules 12, particularly around the corners of the modules 12 in proximity to the gingiva when positioned upon the dentition. In one example, as shown throughout FIGS. 3A to 3E, one or more of the modules 12 may be formed with recesses or radiused portions 24 on either side of the module 12 such that the distal portions of the module 12 narrow relative to the rest of the module cross-section. These recessed or radiused portions 24 may provide additional space between the modules for accessing the underlying surface of the respective crown for cleaning debris or excess adhesive once the bracket has been applied.

Figure 4:
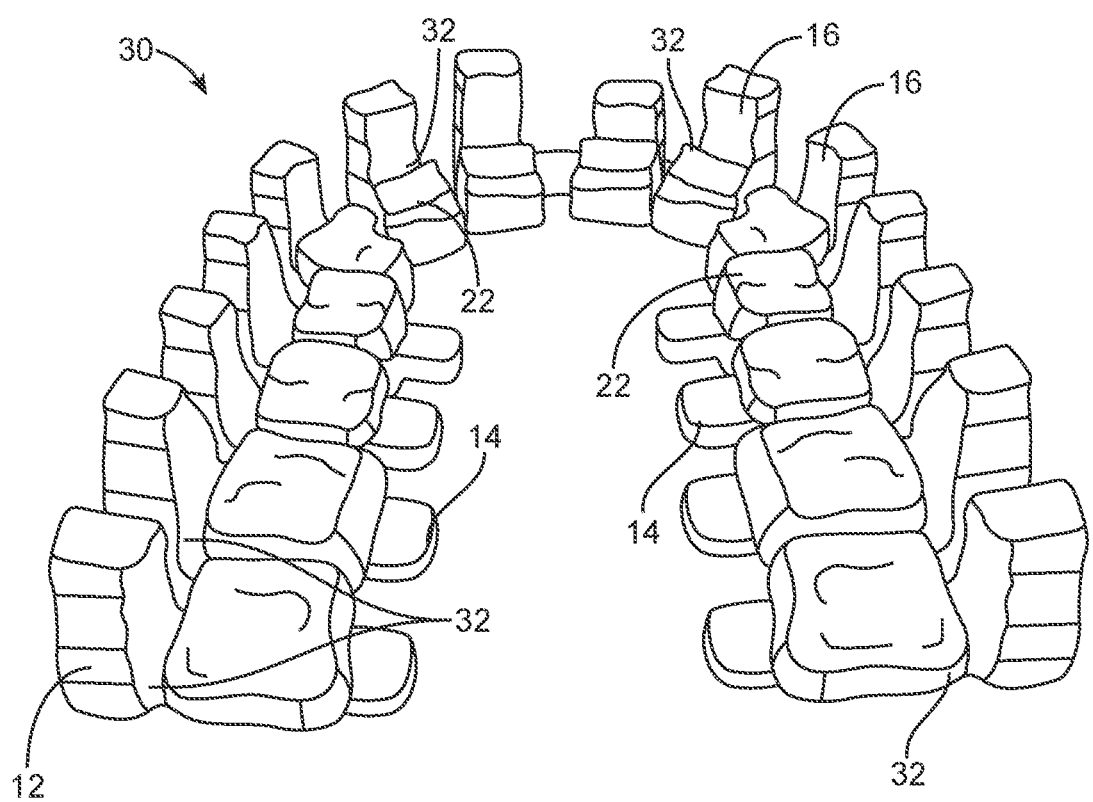
FIG. 4 shows a perspective view of another variation of the IDB tray having break joints formed along the tray for facilitating removal from the dentition.

FIG. 4 shows a perspective view of another variation of the IDB tray 30 which illustrates the individual modules 12, removal tabs 14, and receiving channels 16 but this embodiment may be formed with a break joint 32 located in the region where the occlusal surface of the module 12 meets the buccal portion of the module 12. The break joint 32 may comprise a pivoting or bending portion which may be formed, e.g., by a pre-formed grooves, notches, or cuts which may be varied according to a length of the occlusal extrusion. A boolean subtraction may be performed using the patient's crowns as the cutting body to create the buccal, occlusal, and lingual mating surfaces for each unit. These break joints 32 may be formed to be easily breakable or bendable to facilitate the removal of the IDB tray or individual module from the dentition once the bracket 20 has been bonded to the underlying tooth surface, as described in further detail herein.

Figure 5B:
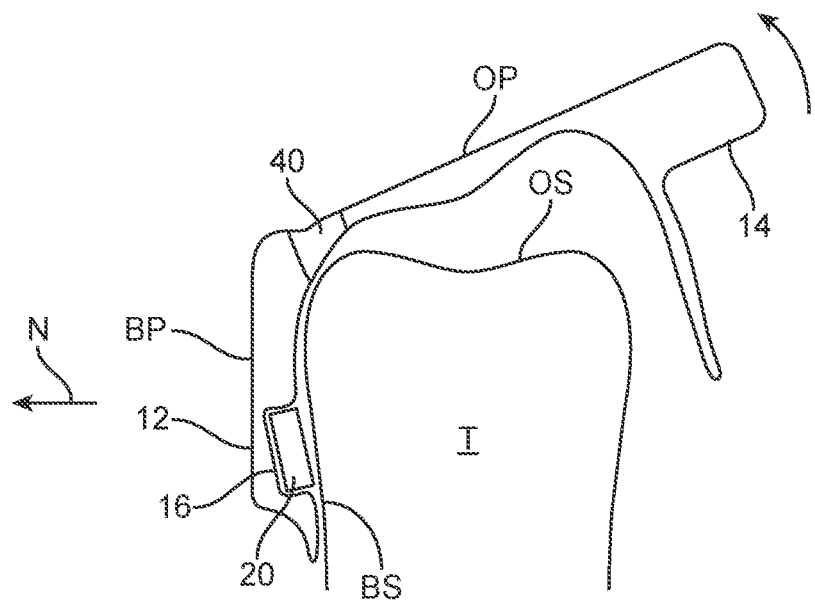

FIGS. 5A and 5B show cross-sectional side views of one example illustrating how the one or more modules 12 or the entire IDB tray 10 may be removed from the patient's dentition without inducing a bonding failure of the bracket 20 or causing damage to the bracket 20 itself. As shown in FIG. 5A, the bracket 20 may be shown positioned within the receiving channel 16 bonded to the underlying buccal surface. The break joint 40 is a weakened portion located where the occlusal plane OP meets the buccal plane BP of the module 12 and the removal tab 14 may be seen extending away from the buccal plane BP and from the buccal surface BS of the tooth T and inwards towards the arch. Once the bracket 20 has been sufficiently bonded and the module 12 is ready to be removed from the dentition, the removal tab 14 may be urged or lifted away from the occlusal surface OS of the underlying tooth T and rotated in the direction as denoted such that the removal tab 14 rotates about the break joint 40 which may function as a pivot. As described herein, the break joint 40 may comprise a weakened portion having a relatively thinned portion or it may define one or more grooves, notches, cuts, etc. which facilitate the bending, yielding, pivoting, etc. of the break joint 40.

As the removal tab 14 is further lifted and rotated about break joint 40, the break joint 40 may begin to yield or partially break such that the module 12 may be lifted away in a normal direction N away from the buccal surface, as shown in FIG. 5B. The lifting or removal of the module 12 away from the bracket 16 in the normal direction N prevents the module 12 from pushing upon the bracket 20 or catching any portion of the bracket 20 (such as any integral hooks which may project away from the bracket). This may prevent displacement of the bracket 20 upon the bonded surface and may also prevent damage to any portion of the bracket 20 during module removal from the dentition.

Figure 6:
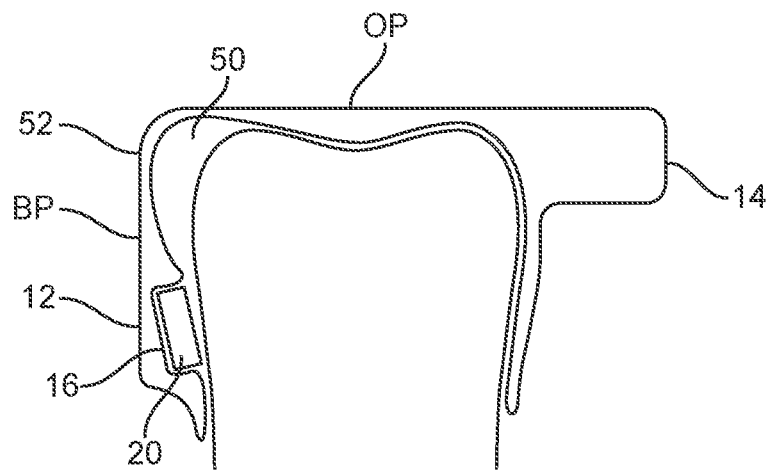
FIG. 6 shows a cross-sectional side view of yet another variation in which the individual module may be formed with a recessed portion.

FIG. 6 shows a cross-sectional side view of yet another variation in which the individual module 12 may be formed with a recessed portion 50 defined along a pivot portion 52 formed where the occlusal plane OP meets the buccal plane BP of the module 12. Here, the recessed portion 50 may allow for access to the space in proximity to where the bracket 20 is bonded. This recessed portion 50 may also provide for a relatively thinned pivot portion 52 which may enable the portion 52 to bend or break when the removal tab 14 is lifted to remove the module 12 from the dentition and adhered bracket 20. Removal of the individual module 12 or IDB tray may be performed in the same or similar manner as described herein.

Figure 7:
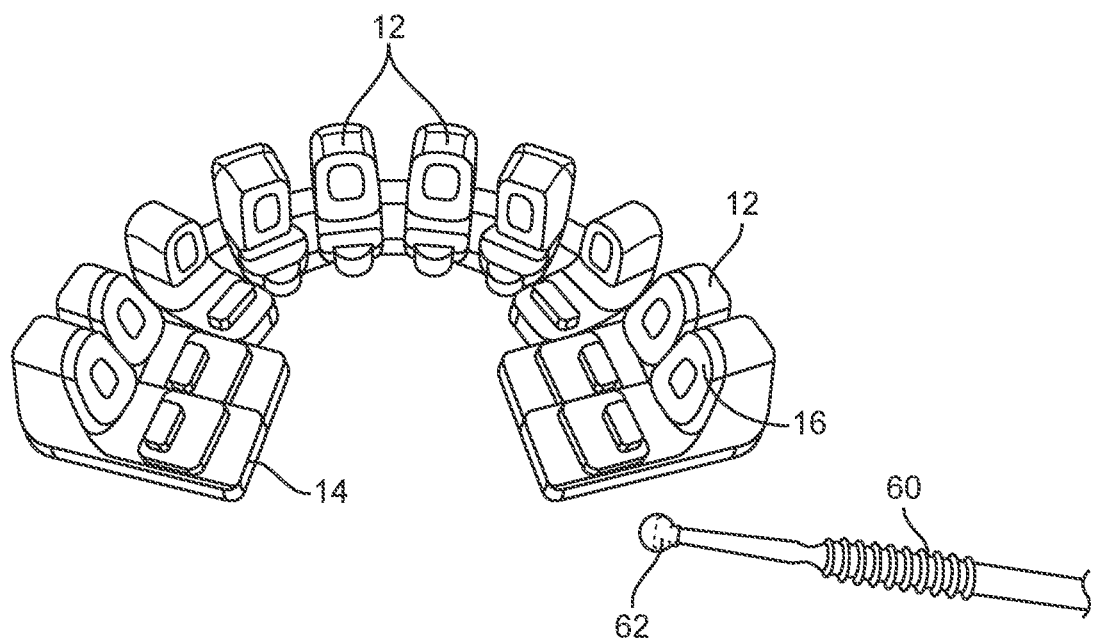
FIG. 7 shows a perspective view of a cleaning instrument which may be used to access the recessed portion for cleaning excess adhesive.

In addition to providing a pivoting portion for removal, the recessed portion 50 may also provide access to the tooth surface in proximity to the bracket 20. When the bracket 20 is adhered upon the surface, excess adhesive may spread over the surface away from the bonded bracket 20. This excess adhesive often spreads between the tooth surface and portions of the module 12. However, the recessed portion 50 may allow for a distal tip 62 of a cleaning instrument 60 to be inserted within the portion 50 for cleaning any of the excess adhesive, as shown in the perspective view of FIG. 7, when the IDB tray is positioned upon the dentition after adhesion of the brackets to their respective surfaces.

Figure 8A:
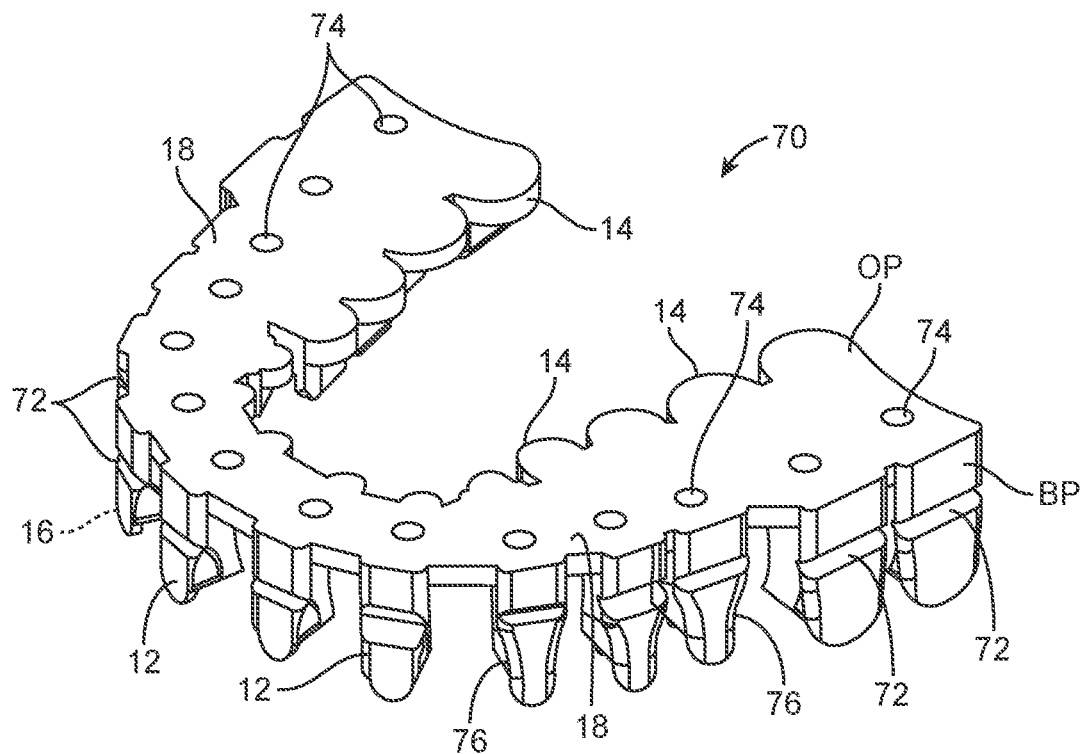
FIGS. 8A to 8B show perspective and bottom views of yet another variation in which the IDB tray may incorporate break joints along the individual modules.
Figure 8B:
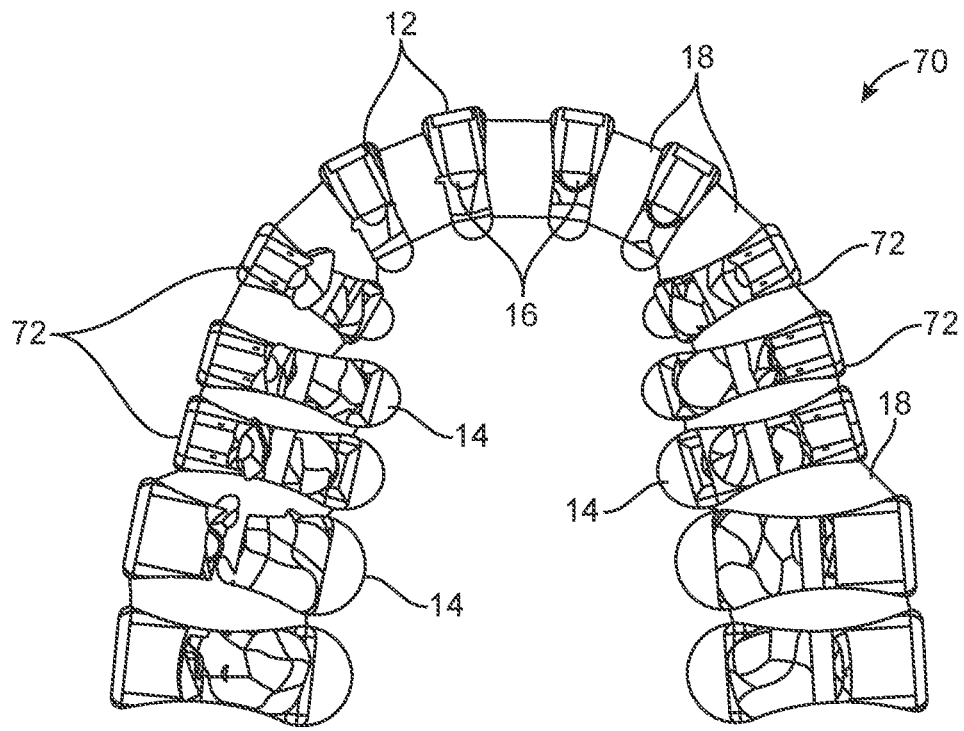

FIGS. 8A and 8B show perspective and bottom views of yet another variation of the IDB tray 70. In this embodiment, the individual modules 12 may have a reduced amount of material used such that the individual modules 12 have relatively more space between adjacent modules 12 and any crowding between the modules is reduced. Additionally, each of the modules 12 may have a break joint 72 located along the buccal plane BP and in proximity to the receiving channel 16. The occlusal side of the receiving channel 16 may also be opened to the occlusal plane OP through an access lumen 74.

Also shown are recessed or radiused portions 76, as described herein, on each of the individual modules 12 or at least one or more of the modules 12 which provide for increased space between adjacent modules 12 for clearing debris or removing any excess adhesive. While the recessed or radiused portions 76 are shown near the distal portions of the module 12 closest to the gingiva when in use upon the dentition, the recessed or radiused portions 76 may also be formed along the proximal portions of the modules 12 in proximity to the occlusal surfaces of the dentition when in use.

Figure 8C:
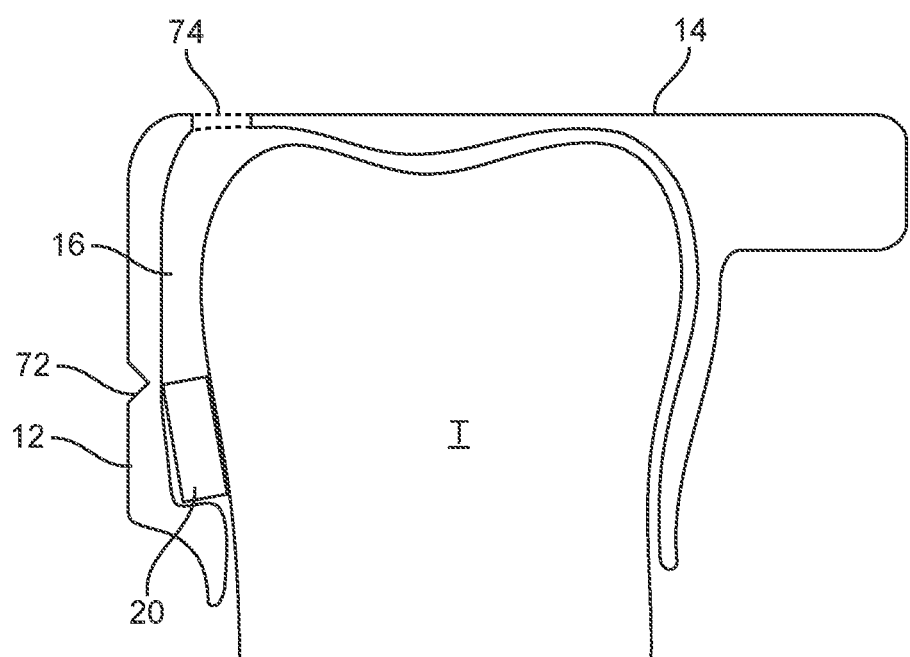
FIG. 8C shows a cross-sectional side view of the IDB tray variation shown in FIGS. 8A and 8B.

FIG. 8C shows a cross-sectional side view of the module 12 to illustrate how the break joint 72 may be aligned along the buccal plane BP in-line with the location of the bracket 20. The receiving channel 16 may also illustrate how the channel 16 adjacent to where the gingiva is located may remain closed while the occlusal side may be removed such that the channel 16 forms an access lumen 74 which is open through the occlusal plane OP to the environment. The access lumen 74 may provide an access opening for removing any debris or for cleaning off any excess bonding agent using, e.g., the cleaning instrument 60, which may be introduced into the access lumen 74 for insertion into the receiving channel 16.

Additionally, the access lumen 74 may also be used to shine a curing light directly into the parting line between the bracket 20 and the underlying crown unhindered, thus allowing for a more secure bond formation as compared to the curing light being transmitted through the resin material of the IDB tray. Moreover, the access lumen 74 may also provide visual feedback of the fit between bracket and crown.

Figure 9:
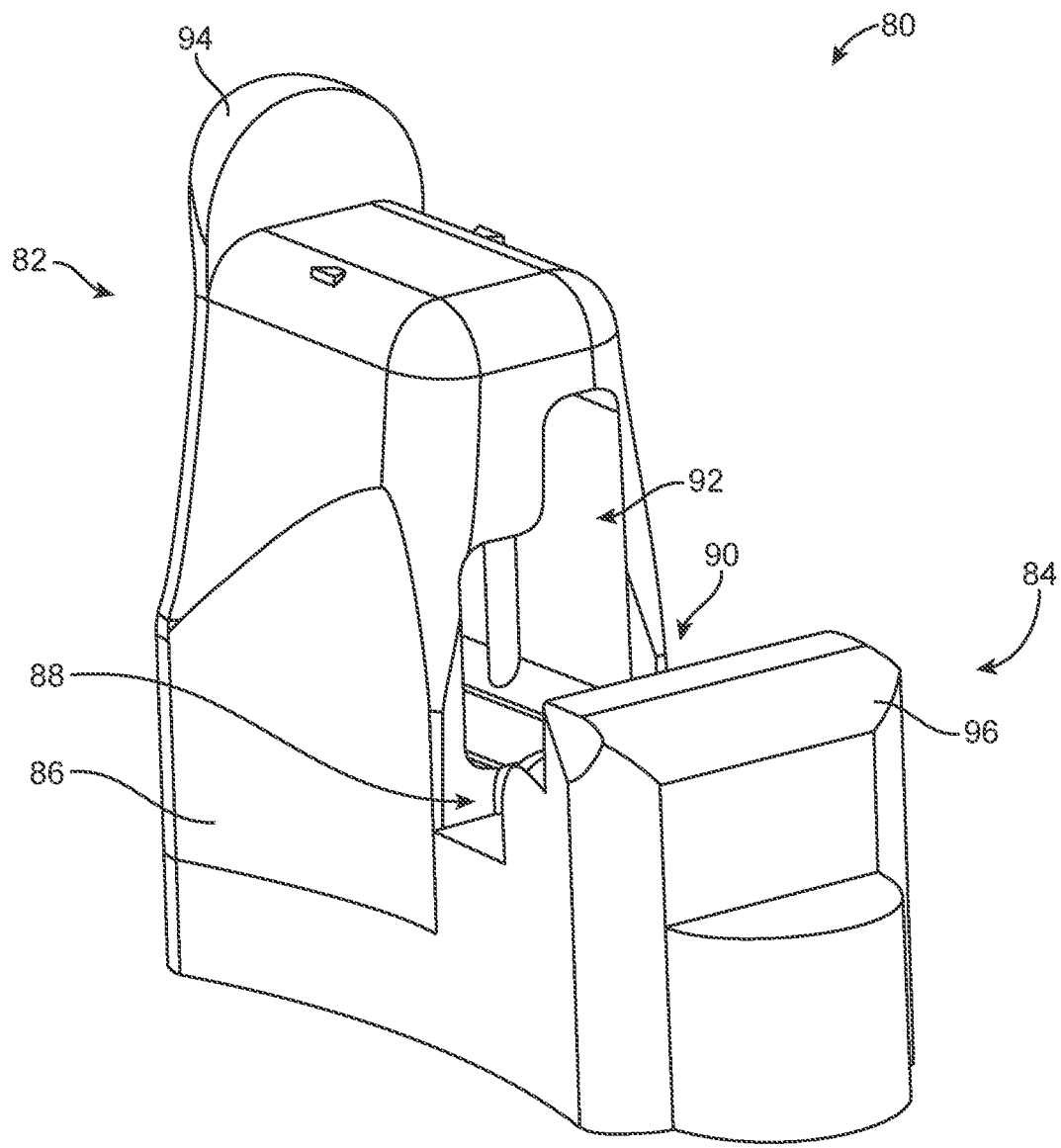
FIG. 9 shows a perspective view of an IDB tray variation having two separate components which may be mated to one another.

In yet another variation, FIG. 9 shows a perspective view of an IDB tray 80 having two separate components rather than a single contiguous 3D printed tray comprised of individual modules. A first component 82 may be comprised of a bracket-receiving module 92 configured for placement against the buccal or lingual crown surface and having a receiving slot 86 for slidingly mating with the second component 84 which may generally comprise an occlusal-buccal-lingual (OBL) mating tray having a mating groove 88 which may be correspondingly inserted within the receiving slot 86 to form a crown receiving channel 90. The second component 84 may further comprise a reinforcing tab 96 which extends transversely relative to the mating groove 88 such that the reinforcing tab 96 is aligned in apposition to the receiving module 92 when the first and second components 82, 84 are secured to one another.

The first component 82 may be, e.g., 3D printed, and may also comprise a removal tab 94 which may project away from the receiving module 92 in parallel with the reinforcing tab 96 of the second component 84 which may also be, e.g., 3D printed. The OBL tray of the second component may be printed to be relatively softer (e.g., relatively lower durometer) than the first component 82, which may be injection molded for increased accuracy. Each of the first component 82 may be mass produced for each crown according to most common geometries of patients.

Figure 10A:
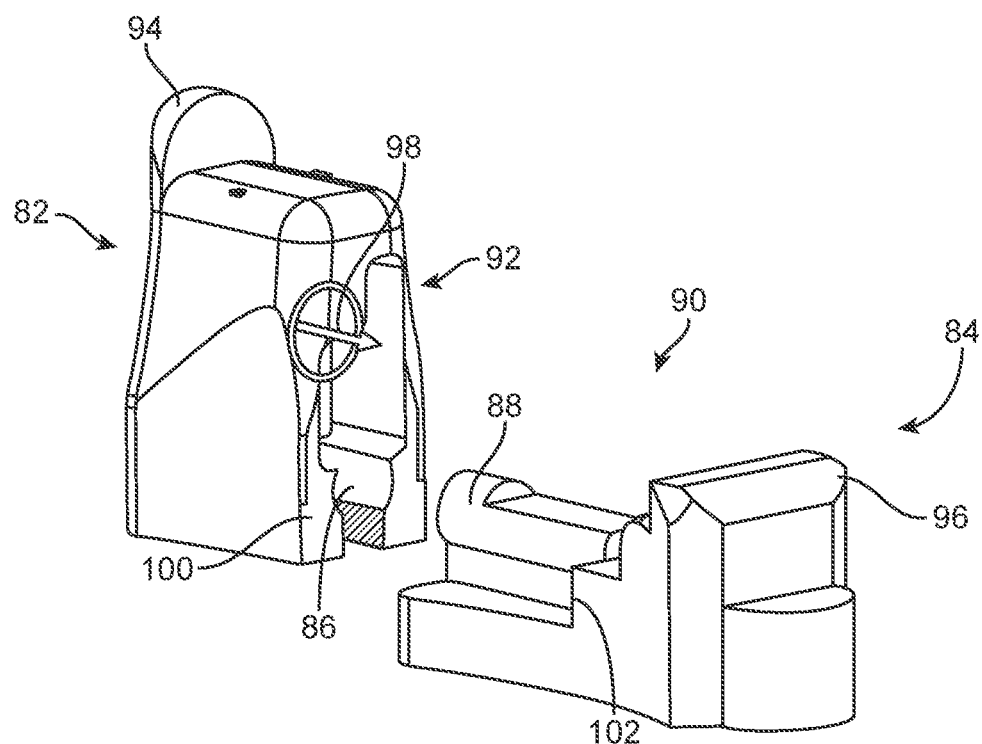
FIGS. 10A and 10B show perspective views of how the components may be secured to one another.
Figure 10B:
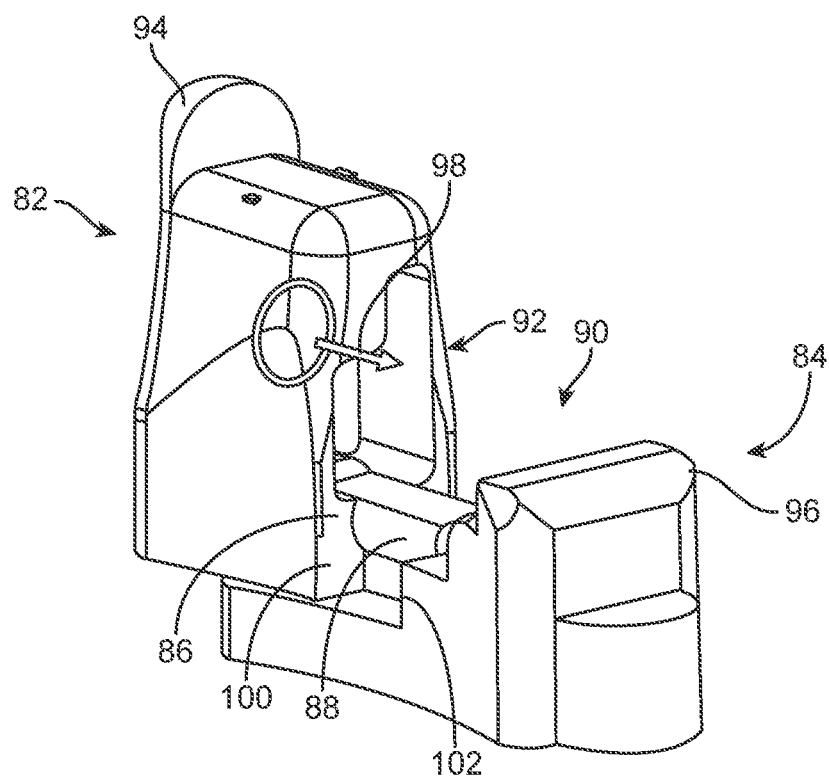

As shown in the perspective assembly views of FIGS. 10A and 10B, the mating groove 88 of the second component 84 may extend transversely away from the reinforcing tab 96 and may be aligned with the receiving slot 86 for slidingly mating to one another. As the mating groove 88 is inserted into the receiving slot 86, the first component 82 and/or second component 84 may be urged towards one another, as indicated by the arrow 98, until a mating surface 100 defined along the first component 82 contacts a mating shoulder 102 defined along the second component 84, as shown. Once slid in entirely, the first and second components 82, 84 may be snapped into engagement via, e.g., a detent mechanism or other locking mechanism.

The geometry of the first and second components 82, 84 and the manner in which they are mated are designed to allow for the perpendicular motion of the bracket-receiving module 92 to the buccal crown face for bonding. This eliminates the occlusal-gingival smearing of the bonding agent as the modules are snapped perpendicularly rather than the first and second components 82, 84 sliding together over the large face of the crown. Because the components 82, 84 are applied and removed perpendicularly relative to the surface of the crown and adhered bracket, the components 82, 84 are prevented from excessive contact with the bracket, particularly during removal of the tray from the dentition. This minimization of contact between the components 82, 84 and the bracket further prevents damage to the bracket and also ensures that the bracket is not moved inadvertently after securement to the crown surface and further prevents smearing of the bonding agent. Also, the distance between the components may be varied depending upon the desired amount of compressive force imparted upon the crown where an increased amount of force may result in a more accurate placement of the bracket and less movement after placement.

Figure 11A:
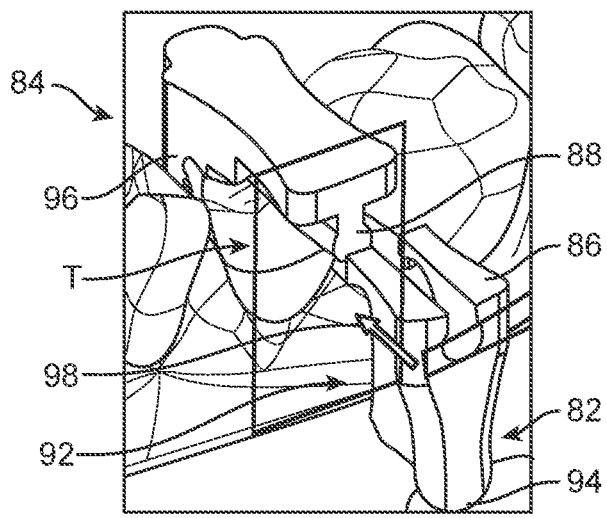
FIGS. 11A and 11B show perspective and top views of how the second component may be situated upon the lingual surface of the tooth and how the first component may be aligned for engagement.
Figure 11B:
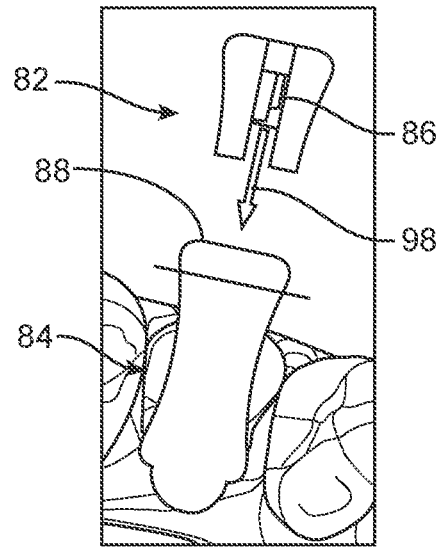
Figure 12A:
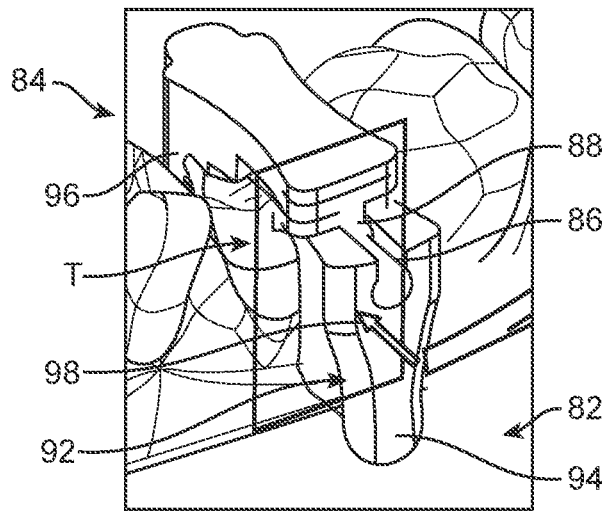
FIGS. 12A and 12B show perspective and top views of how the second component may be advanced towards the first component for engagement.
Figure 12B:
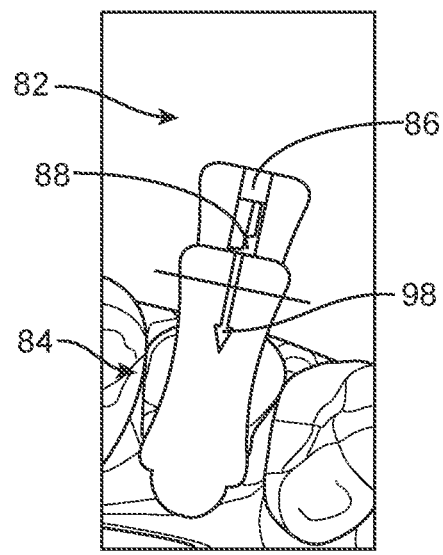

FIGS. 11A and 11B illustrate perspective and top views of how the second component 84 may be situated upon the lingual surface of the tooth T and how the first component 82 may be aligned for engagement. As shown, the receiving channel 92 with bracket may be positioned to face the buccal surface and the mating groove 88 may be aligned with the receiving slot 86. FIGS. 12A and 12B show how the first component 82 may be advanced towards the second component 84 and buccal crown surface as the mating groove 88 slides within the receiving slot 86.

Figure 13A:
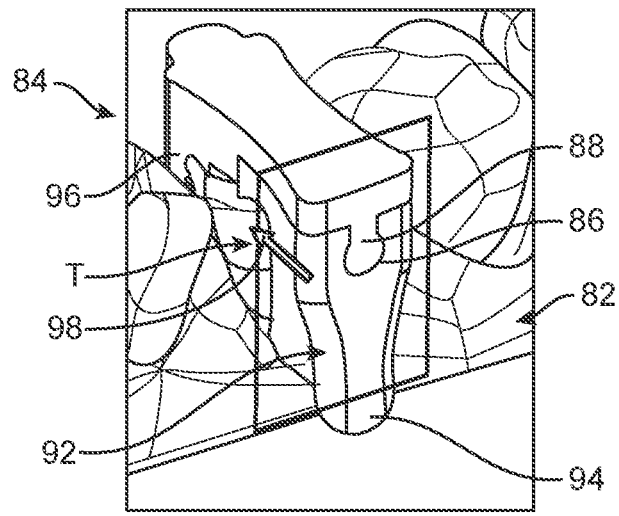
FIGS. 13A and 13B show perspective and top views of how the second component may be engaged to the first component.
Figure 13B:
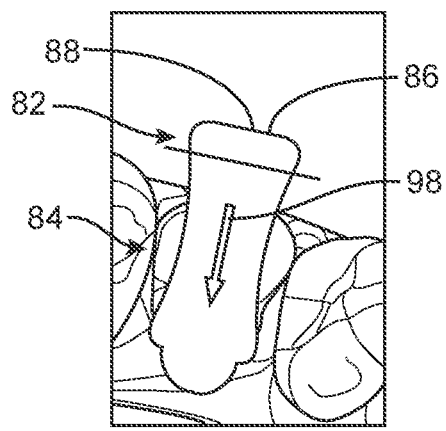

As the first component 82 is fully advanced into contact against the crown surface, as shown in FIGS. 13A and 13B, the mating groove 88 may lock with the receiving slot 86 to maintain the position of the components 82, 84 relative to one another and relative to the crown. In one variation, the components 82, 84 may snap into two stages of engagement where the first stage of engagement may occur with an initial amount of clearance between the crown and bracket and the second stage of engagement with complete engagement and a normal force between the two. Once the bracket contained within the receiving channel 92 has bonded sufficiently to the underlying surface of the crown, the first component 82 may be grasped, e.g., via removal tab 94 or by grasping the sides of the component 82, and pulled away from the second component 84 such that the first component 82 slides along the mating groove 88 while being pulled directly away from the crown and the adhered bracket in a normal direction without interference from the bracket. The second component 84 may then be removed from the tooth as well.

While the first and second components 82, 84 may be formed as an individual module, multiple modules of the second component 84 may be attached to one another, as described above, for placement upon one or more teeth. The individual first components 82 may be attached individually to a corresponding second component 84 as needed or desired.

The applications of the devices and methods discussed above are not limited to the one described but may include any number of further treatment applications. Modification of the above-described assemblies and methods for carrying out the invention, combinations between different variations as practicable, and variations of aspects of the invention that are obvious to those of skill in the art are intended to be within the scope of the claims.

What is claimed is:

1. An indirect bonding tray apparatus, comprising:
   one or more individual modules each defining a receiving channel for retaining an orthodontic appliance within and configured for placement upon a dentition of a subject;
   wherein the one or more individual modules are configured into an arch in which each of the modules is coupled to an adjacent module such that the arch comprises a single contiguous indirect bonding tray apparatus which is configured for placement upon the dentition, and
   wherein each of the one or more individual modules defines a flattened occlusal surface which is coplanar with one another such that each of the flattened occlusal surfaces collectively define a common plane over the apparatus, and
   wherein each of the one or more individual modules defines an access lumen each of which extends directly through the flattened occlusal surface such that the access lumen is in communication with the receiving channel.

2. The apparatus of claim 1 further comprising a removal tab having a length which extends transversely relative to the individual module.

3. The apparatus of claim 2 further comprising a pivoting portion located away from the removal tab such that the removal tab is rotatable about the pivoting portion.

4. The apparatus of claim 3 wherein the pivoting portion comprises a break joint configured to yield or bend.

5. The apparatus of claim 3 wherein the pivoting portion is located in proximity to where the occlusal plane and buccal plane of the indirect bonding tray apparatus meet.

6. The apparatus of claim 3 wherein the pivoting portion is located along a buccal plane in proximity to the receiving channel.

7. The apparatus of claim 3 wherein the pivoting portion defines a recessed portion in proximity to the receiving channel.

8. The apparatus of claim 1 wherein each of the modules is detachably removable from the adjacent module.

9. The apparatus of claim 1 further comprising a reinforcing tab extending from the individual module.

10. The apparatus of claim 1 further comprising an orthodontic bracket positionable within the receiving channel.

11. An indirect bonding tray apparatus, comprising:
    a first component defining a receiving channel and configured for placement upon a first surface of a tooth of a subject, wherein the receiving channel is configured for retaining an orthodontic appliance against the first surface of the tooth;
    a second component extending transversely and configured for placement upon a second surface of the tooth opposite to the first surface,
    wherein the first component and the second component define a flattened occlusal surface over the apparatus and are configured to conform to a dentition of the subject and where the first component defines an access lumen which extends directly through the flattened occlusal surface such that the access lumen is in communication with the receiving channel.

12. The apparatus of claim 11 wherein the first component further comprises a removal tab having a length which extends transversely relative to the first component.

13. The apparatus of claim 11 wherein the first component and second component are removably securable relative to one another.

14. The apparatus of claim 11 further comprising an orthodontic bracket positionable within the receiving channel.

* * * * *